United States Patent
Zhang et al.

(10) Patent No.: US 10,158,884 B2
(45) Date of Patent: Dec. 18, 2018

(54) SIMPLIFIED MERGE LIST CONSTRUCTION PROCESS FOR 3D-HEVC

(71) Applicant: QUALCOMM Incorporated, San Diego, CA (US)

(72) Inventors: Li Zhang, San Diego, CA (US); Ying Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 664 days.

(21) Appl. No.: 14/662,071

(22) Filed: Mar. 18, 2015

(65) Prior Publication Data
US 2015/0271524 A1    Sep. 24, 2015

Related U.S. Application Data

(60) Provisional application No. 61/955,720, filed on Mar. 19, 2014.

(51) Int. Cl.
| | |
|---|---|
| H04N 19/597 | (2014.01) |
| H04N 19/52 | (2014.01) |
| H04N 19/70 | (2014.01) |
| H04N 19/51 | (2014.01) |
| H04N 19/30 | (2014.01) |

(52) U.S. Cl.
CPC ......... *H04N 19/597* (2014.11); *H04N 19/30* (2014.11); *H04N 19/51* (2014.11); *H04N 19/70* (2014.11); *H04N 19/52* (2014.11)

(58) Field of Classification Search
CPC ....... H04N 19/597; H04N 19/52; H04N 19/70
USPC ...................................... 375/240.12, 240.16
See application file for complete search history.

(56) References Cited

U.S. PATENT DOCUMENTS

2014/0181885 A1*  6/2014  Rusert ............ H04N 21/234327
                                                725/131

OTHER PUBLICATIONS

Wiegand et al., "WD1: Working Draft 1 of High-Efficiency Video Coding", JCTVC-C403, 3rd Meeting: Guangzhou, CN, Oct. 7-15, 2010, (Joint Collaborative Team on Video Coding of ISO/IEC JTC1/SC29/WG11 and ITU-T SG.16); Jan. 6, 2011, 137 pp.
Wiegand et al., "WD2: Working Draft 2 of High-Efficiency Video Coding," JCTVC-D503, 4th Meeting: Daegu, KR, Jan. 20-28, 2011, (Joint Collaborative Team on Video Coding of ISO/IEC JTC1/SC29/WG11 and ITU-T SG.16); Apr. 15, 2011, 153 pp.
Wiegand et al., "WD3: Working Draft 3 of High-Efficiency Video Coding," Document JCTVC-E603, 5th Meeting: Geneva, CH, Mar. 16-23, 2011,(Joint Collaborative Team on Video Coding of ISO/IEC JTC1/SC29/WG11 and ITU-T SG.16); May 9, 2015, 193 pp.
Bross et al., "WD4: Working Draft 4 of High-Efficiency Video Coding," 6th Meeting: Torino, IT, Jul. 14-22, 2011, (Joint Collaborative Team on Video Coding of ISO/IEC JTC1/SC29/WG11 and ITU-T SG.16);JCTVC-F803_d2, Oct. 4, 2011, 226 pp.

(Continued)

*Primary Examiner* — On S Mung
(74) *Attorney, Agent, or Firm* — Shumaker & Sieffert, P.A.

(57) ABSTRACT

A device for encoding video data includes a memory configured to store video data and a video encoder comprising one or more processors configured to, for a current layer being encoded, determine that the current layer has no direct reference layers, based on determining that the current layer has no direct reference layers, set at least one of a first syntax element, a second syntax element, a third syntax element, or a fourth syntax element to a disabling value indicating that a coding tool corresponding to the syntax element is disabled for the current layer.

15 Claims, 14 Drawing Sheets

(56) References Cited

OTHER PUBLICATIONS

Bross et al., "WD5: Working Draft 5 of High-Efficiency Video Coding," 7th Meeting: Geneva, Switzerland, Nov. 21-30, 2011, (Joint Collaborative Team on Video Coding of ISO/IEC JTC1/SC29/WG11 and ITU-T SG.16);JCTVC-G1103_d2, Dec. 30, 2011, 214 pp.
Bross et al., "High efficiency video coding (HEVC) text specification draft 6," 8th Meeting: San Jose, CA, USA, Feb. 1-10, 2012, (Joint Collaborative Team on Video Coding of ISO/IEC JTC1/SC29/WG11 and ITU-T SG.16); JCTVC-H1003, Apr. 2, 2012, 259 pp.
Bross et al., "High efficiency video coding (HEVC) text specification draft 7," 9th Meeting: Geneva, CH, Apr. 27-May 7, 2012, (Joint Collaborative Team on Video Coding of ISO/IEC JTC1/SC29/WG11 and ITU-T SG.16); JCTVC-I1003_d2, Jun. 1, 2012, 290 pp.
Bross et al., "High efficiency video coding (HEVC) text specification draft 8," 10th Meeting: Stockholm, SE, Jul. 11-20, 2012, (Joint Collaborative Team on Video Coding of ISO/IEC JTC1/SC29/WG11 and ITU-T SG.16); JCTVC-J1003_d7, Jul. 28, 2012, 261 pp.
Bross et al., "High efficiency video coding (HEVC) text specification draft 9," 11th Meeting: Shanghai, CN, Oct. 10-19, 2012, (Joint Collaborative Team on Video Coding of ISO/IEC JTC1/SC29/WG11 and ITU-T SG.16); JCTVC-K1003_v7, Nov. 2, 2012, 290 pp.
Bross et al., "High efficiency video coding (HEVC) text specification draft 10 (for FDIS & Last Call)," 12th Meeting: Geneva, CH, Jan. 14-23, 2013, (Joint Collaborative Team on Video Coding of ISO/IEC JTC1/SC29/WG11 and ITU-T SG.16); JCTVC-L1003_v34, Mar. 19, 2013, 310 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.
ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.
Tian, et al., "CE1.h: Backward View Synthesis Prediction using Neighbouring Blocks," JCT Meeting; Jan. 16-23, 2013 (Joint Collaborative Team on 3D Video Coding Extensions Development of ITU-T SG 16 WP3 and ISO/IEC JTC 1/SC 29/WG 11); Jan. 10, 2013; No. JCT3V-C0152, 5 pp.
Zhang, et al., "CE4: Advanced residual prediction for multiview coding," JCT Meeting; Apr. 20-26, 2013; (Joint Collaborative Team on 3D Video Coding Extensions Development of ITU-T SG 16 WP3 and ISO/IEC JTC 1/SC 29/WG 11); Apr. 13, 2013; No. JCT3V-D0177, 9 pp.
An, et al., "3D-CE3: Sub-PU level inter-view motion prediction," JCT Meeting; Oct. 25-Nov. 1, 2013; (Joint Collaborative Team on 3D Video Coding Extensions Development of ITU-T SG 16 WP3 and ISO/IEC JTC 1/SC 29/WG 11); Mar. 27, 2013; No. JCT3V-F0110; 4 pp.
Zhang, et al. "CE4: Further improvements on advanced residual prediction," JCT Meeting; Oct. 25-Nov. 1, 2013; (Joint Collaborative Team on 3D Video Coding Extensions Development of ITU-T SG 16 WP3 and ISO/IEC JTC 1/SC 29/WG 11); Oct. 18, 2013; No. JCT3V-F0123, 6 pp.
Tech, et al., "3D-HEVC Draft Text 2," JCT Meeting; Oct. 25-Nov. 1, 2013; (Joint Collaborative Team on 3D Video Coding Extensions Development of ITU-T SG 16 WP3 and ISO/IEC JTC 1/SC 29/WG 11); No. JCT3V-F1001_v4, Dec. 14, 2013; 94 pp.
Zhang, et al., "Test Model 6 of 3D-HEVC and MV-HEVC," Oct. 25-Nov. 1, 2013; (Joint Collaborative Team on 3D Video Coding Extensions Development of ITU-T SG 16 WP3 and ISO/IEC JTC 1/SC 29/WG 11); No. JCT3V-F1050, Dec. 16, 2013, 57 pp.
An, et al., "Availability checking of temporal inter-view MV candidate and VSP candidate," Nov. 11-17, 2013; (Joint Collaborative Team on 3D Video Coding Extensions Development of ITU-T SG 16 WP3 and ISO/IEC JTC 1/SC 29/WG 11); Mar. 27, 2013; No. JCT3V-G0067, 4 pp.
Tech, et al., "3D-HEVC Draft Text 3," Jan. 9-17, 2014; (Joint Collaborative Team on 3D Video Coding Extensions Development of ITU-T SG 16 WP3 and ISO/IEC JTC 1/SC 29/WG 11); No. JCT3V-G1001_v2, Mar. 10, 2014; 102 pp.
Zhang L., et al., "CE5.h: Disparity vector generation results", JCT2-A0097, JCT-3V Meeting; MPEG Meeting; Jul. 16-20, 2012; Stockholm; (The Joint Collaborative Team on 3D Video Coding Extension Development of ISO/IEC JTC1/SC29/WG11 and ITU-T SG.16); URL: http://phenix.int-evry_fr/jct2/, XP030130096, Jul. 10, 2012; 5 pp.
Sung, et al., "3D-CE5.h: Simplification of disparity vector derivation for HEVC-based on 3D video coding," JCT Meeting; MPEG Meeting; (The Joint Collaborative Team on 3D Video Coding Extension Development of ISO/IEC JTC1/SC29/WG11 and ITU-T SG.16); Jul. 16-20, 2012, JCT2-A0126, Jul. 14, 2012; 4 pp.
Zhao, et al., "CE3: Inter-view motion vector prediction for depth coding," JCT Meeting; MPEG Meeting; (The Joint Collaborative Team on 3D Video Coding Extension Development of ISO/IEC JTC1/SC29/WG11 and ITU-T SG.16); Oct. 25-Nov. 1, 2013; No. JCT3V-F0125, Oct. 18, 2013; 6 pp.
Kang, et al., "CE2.h related: CU-based Disparity Vector Derivation in 3D-HEVC," JCT Meeting; MPEG Meeting; (The Joint Collaborative Team on 3D Video Coding Extension Development of ISO/IEC JTC1/SC29/WG11 and ITU-T SG.16); Apr. 20-26, 2013; No. JCT3V-D0181, Apr. 22, 2013; 4 pp.
Zhang, et al., "3D-CE4: Advanced residual prediction for multiview coding," JCT Meeting; MPEG Meeting; (The Joint Collaborative Team on 3D Video Coding Extension Development of ISO/IEC JTC1/SC29/WG11 and ITU-T SG.16); Jan. 17-23, 2013; No. JCT3V-C0049, Jan. 16, 2013, 6 pp.
Kang, et al., "3D-CE5.h related: Improvements for disparity vector derivation," JCT Meeting; MPEG Meeting; (The Joint Collaborative Team on 3D Video Coding Extension Development of ISO/IEC JTC1/SC29/WG11 and ITU-T SG.16); Oct. 13-19, 2012, No. JCT3V-B0047, Oct. 10, 2012; 4 pp.
Zhang, et al., "CE5.h: Disparity vector generation results," JCT Meeting; MPEG Meeting; (The Joint Collaborative Team on 3D Video Coding Extension Development of ISO/IEC JTC1/SC29/WG11 and ITU-T SG.16); Jul. 16-20, 2012; No. JCT2-A0097, Jul. 11, 2012; 5 pp.

* cited by examiner

SIMPLIFIED MERGE LIST CONSTRUCTION PROCESS FOR 3D-HEVC

This application claims the benefit of U.S. Provisional Patent Application 61/955,720 filed 19 Mar. 2014, the entire content of which is hereby incorporated by reference.

TECHNICAL FIELD

This disclosure relates to video encoding and decoding.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards, to transmit, receive and store digital video information more efficiently.

Extensions of some of the aforementioned standards, including H.264/AVC, may provide techniques for multiview video coding in order to produce stereo or three-dimensional ("3D") video. In particular, techniques for multiview coding have been proposed for use in AVC, with the scalable video coding (SVC) standard (which is the scalable extension to H.264/AVC), and the multi-view video coding (MVC) standard (which has become the multiview extension to H.264/AVC).

Typically, stereo video is achieved using two views, e.g., a left view and a right view. A picture of the left view can be displayed substantially simultaneously with a picture of the right view to achieve a three-dimensional video effect. For example, a user may wear polarized, passive glasses that filter the left view from the right view. Alternatively, the pictures of the two views may be shown in rapid succession, and the user may wear active glasses that rapidly shutter the left and right eyes at the same frequency, but with a 90 degree shift in phase.

SUMMARY

This disclosure describes techniques that may reduce the encoding and decoding complexity associated with inter prediction using inter-view reference pictures.

In one example, a method of encoding video data includes for a current layer being encoded, determining that the current layer has no direct reference layers; based on determining that the current layer has no direct reference layers, setting at least one of a first syntax element, a second syntax element, a third syntax element, or a fourth syntax element to a disabling value indicating that a coding tool corresponding to the syntax element is disabled, wherein a disabling value for the first syntax element indicates that inter-view motion parameter prediction is disabled for the current layer, wherein a disabling value for the second syntax element indicates that view synthesis prediction merge candidates are disabled for the current layer, wherein a disabling value for the third syntax element indicates that accessing depth view components are disabled for the derivation process for a disparity vector for the current layer, and wherein a disabling value for the fourth syntax element indicates that inter-view residual prediction is disabled for the current layer; and generating an encoded bitstream of video data comprising the first syntax element, the second syntax element, the third syntax element, and the fourth syntax element.

In another example, a device for encoding video data includes a memory configured to store video data; and a video encoder comprising one or more processors configured to: for a current layer being encoded, determine that the current layer has no direct reference layers; based on determining that the current layer has no direct reference layers, set at least one of a first syntax element, a second syntax element, a third syntax element, or a fourth syntax element to a disabling value indicating that a coding tool corresponding to the syntax element is disabled, wherein a disabling value for the first syntax element indicates that inter-view motion parameter prediction is disabled for the current layer, wherein a disabling value for the second syntax element indicates that view synthesis prediction merge candidates are disabled for the current layer, wherein a disabling value for the third syntax element indicates that accessing depth view components are disabled for the derivation process for a disparity vector for the current layer, and wherein a disabling value for the fourth syntax element indicates that inter-view residual prediction is disabled for the current layer; and generate an encoded bitstream of video data comprising the first syntax element, the second syntax element, the third syntax element, and the fourth syntax element.

In another example, an apparatus for encoding video data includes means for determining that a current layer being encoded has no direct reference layers; means for setting at least one of a first syntax element, a second syntax element, a third syntax element, or a fourth syntax element to a disabling value indicating that a coding tool corresponding to the syntax element is disabled based on determining that the current layer has no direct reference layers, wherein a disabling value for the first syntax element indicates that inter-view motion parameter prediction is disabled for the current layer, wherein a disabling value for the second syntax element indicates that view synthesis prediction merge candidates are disabled for the current layer, wherein a disabling value for the third syntax element indicates that accessing depth view components are disabled for the derivation process for a disparity vector for the current layer, and wherein a disabling value for the fourth syntax element indicates that inter-view residual prediction is disabled for the current layer; and means for generating an encoded bitstream of video data comprising the first syntax element, the second syntax element, the third syntax element, and the fourth syntax element.

In another example, a computer-readable storage medium stores instructions that when executed by one or more processors cause the one or more processors to, for a current layer being encoded, determine that the current layer has no direct reference layers; based on determining that the current layer has no direct reference layers, set at least one of a first syntax element, a second syntax element, a third syntax element, or a fourth syntax element to a disabling value indicating that a coding tool corresponding to the syntax element is disabled, wherein a disabling value for the first syntax element indicates that inter-view motion parameter prediction is disabled for the current layer, wherein a disabling value for the second syntax element indicates that view synthesis prediction merge candidates are disabled for the current layer, wherein a disabling value for the third syntax element indicates that accessing depth view components are disabled for the derivation process for a disparity vector for the current layer, and wherein a disabling value for the fourth syntax element indicates that inter-view residual prediction is disabled for the current layer; and generate an encoded bitstream of video data comprising the first syntax element, the second syntax element, the third syntax element, and the fourth syntax element.

The details of one or more examples are set forth in the accompanying drawings and the description below. Other features, objects, and advantages will be apparent from the description and drawings, and from the claims.

DETAILED DESCRIPTION

This disclosure describes techniques related to multiview video coding based on advanced codecs, including techniques for coding two or more views with a 3D-HEVC codec. More specifically, this disclosure describes techniques related to merge list construction and modifications to high level syntax design.

In single view video coding, a video encoder or decoder can predict a current block of a current picture being coded based on already coded blocks in the same picture as the current block. This coding technique is referred to as intra prediction or intra coding. A video encoder or decoder may also predict a current block based on already coded blocks in temporally different, reference pictures. This coding technique is commonly referred to as inter prediction or inter coding.

As single view video coding only includes one view, when performing inter coding, the video encoder or decoder is limited to predicting the current block using reference pictures that correspond to different temporal instances of the same view as the current picture being coded. In multiview video coding, however, the video encoder or decoder may also predict a current block using reference pictures of additional views in addition to temporal reference pictures from the same view. The availability of these additional reference pictures may improve overall coding quality, but it may also greatly increase encoding and decoding complexity due to the number of additional reference pictures that have to be stored and searched. This disclosure describes techniques that may reduce the encoding and decoding complexity associated with inter prediction using inter-view reference pictures.

In this disclosure various techniques may be described with respect to a video decoder. Unless explicitly stated otherwise, however, it should not be assumed that these same techniques cannot also be performed by a video encoder. The video encoder may, for example, perform the same techniques as part of determining how to code video data or may perform the same techniques in a decoding loop of the video encoding process. Likewise, for ease of explanation, some techniques of this disclosure may be described with respect to a video encoder, but unless explicitly stated otherwise, it should not be assumed that such techniques can not also be performed by a video decoder.

Figure 1:
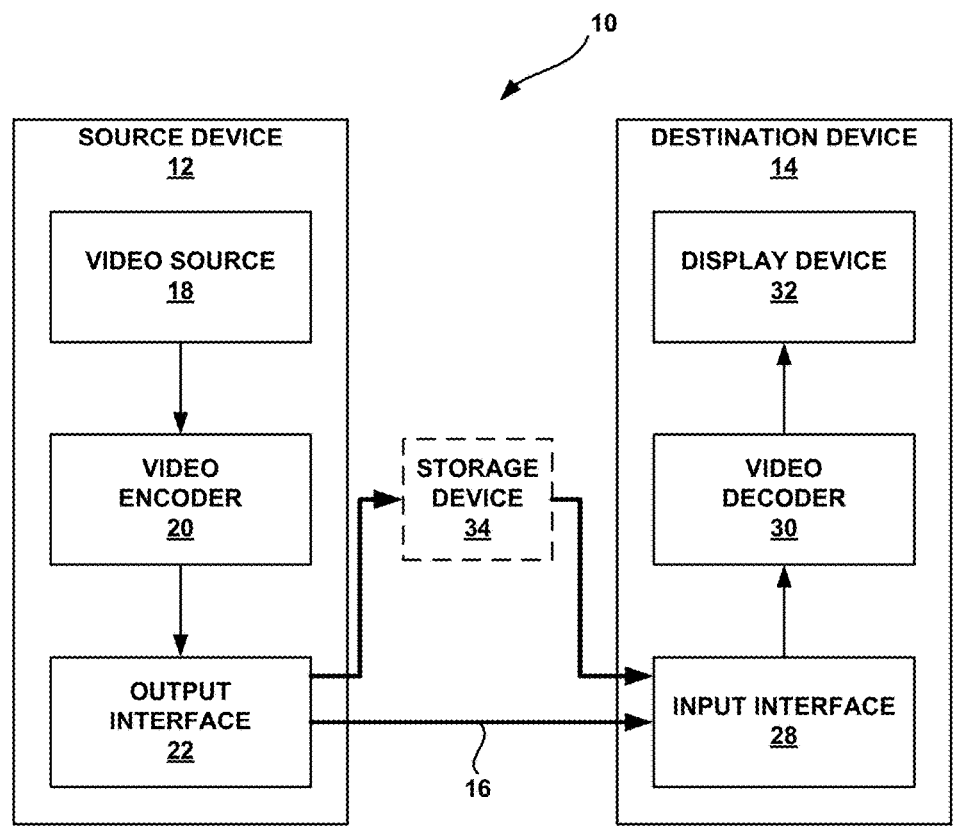
FIG. 1 is a block diagram illustrating an example video encoding and decoding system that may utilize the techniques described in this disclosure.

FIG. 1 is a block diagram illustrating an example video encoding and decoding system 10 that may be configured to perform the techniques described in this disclosure. As shown in FIG. 1, system 10 includes a source device 12 that generates encoded video data to be decoded at a later time by a destination device 14. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming devices, or the like. In some cases, source device 12 and destination device 14 may be equipped for wireless communication.

System 10 may operate in accordance with different video coding standards, a proprietary standard, or any other way of multiview coding. The following describes a few examples of video coding standards, and should not be considered limiting. Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions. The latest joint draft of MVC is described in "Advanced video coding for generic audiovisual services," ITU-T Recommendation H.264, March 2010, the entire content of which is incorporated herein by reference. Another joint draft of the MVC is described in "Advanced video coding for generic audiovisual services," ITU-T Recommendation H.264, June 2011, the entire content of which is incorporated herein by reference. Some additional video coding standards include the MVC+D and 3D-AVC, which are based on AVC. In addition, a new video coding standard, namely the High-Efficiency Video Coding (HEVC), has been developed by the Joint Collaboration Team on Video Coding (JCT-VC) of ITU-T Video Coding Experts Group (VCEG) and ISO/IEC Motion Picture Experts Group (MPEG).

For purposes of illustration only, the techniques described in this disclosure are described with respect to the H.264 standard and the HEVC standard, and various extensions thereof (e.g. 3D-AVC and 3D-HEVC). However, the techniques described in this disclosure should not be considered limited to these example standards and may be extendable to other video coding standards for multiview coding or 3D video coding or to techniques related to multiview coding or 3D video coding that are not necessarily based on a particular video coding standard. The techniques described in this disclosure may be implemented by video encoders/decoders (codecs) for multiview coding, where multiview coding includes coding of two or more views.

Destination device 14 may receive the encoded video data to be decoded via a link 16. Link 16 may comprise any type of medium or device capable of moving the encoded video data from source device 12 to destination device 14. In one example, link 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

Alternatively, encoded data may be output from output interface 22 to a storage device 34. Similarly, encoded data may be accessed from storage device 34 by input interface. Storage device 34 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 34 may correspond to a file server or another intermediate storage device that may hold the encoded video generated by source device 12. Destination device 14 may access stored video data from storage device 34 via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 34 may be a streaming transmission, a download transmission, or a combination of both.

The techniques of this disclosure are not necessarily limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes a video source 18, video encoder 20 and an output interface 22. As will be explained in greater detail below, video encoder 20 may be configured to perform the techniques described in this disclosure. In some cases, output interface 22 may include a modulator/demodulator (modem) and/or a transmitter. In source device 12, video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called camera phones or video phones. However, the techniques described in this disclosure may be applicable to video coding in general, and may be applied to wireless and/or wired applications.

The captured, pre-captured, or computer-generated video may be encoded by video encoder 20. The encoded video data may be transmitted directly to destination device 14 via output interface 22 of source device 12. The encoded video data may also (or alternatively) be stored onto storage device 34 for later access by destination device 14 or other devices, for decoding and/or playback.

Destination device 14 includes an input interface 28, a video decoder 30, and a display device 32. As will be explained in greater detail below, video decoder 30 may be configured to perform the techniques described in this disclosure. In some cases, input interface 28 may include a receiver and/or a modem. Input interface 28 of destination device 14 receives the encoded video data over link 16. The encoded video data communicated over link 16, or provided on storage device 34, may include a variety of syntax elements generated by video encoder 20 for use by a video decoder, such as video decoder 30, in decoding the video data. Such syntax elements may be included with the encoded video data transmitted on a communication medium, stored on a storage medium, or stored a file server.

Display device 32 may be integrated with, or external to, destination device 14. In some examples, destination device 14 may include an integrated display device and also be configured to interface with an external display device. In other examples, destination device 14 may be a display device. In general, display device 32 displays the decoded video data to a user, and may comprise any of a variety of display devices such as a liquid crystal display (LCD), a plasma display, an organic light emitting diode (OLED) display, or another type of display device.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. For example, the techniques described in this disclosure may be described from the perspective of an apparatus or a device. As one example, the apparatus or device may include video decoder 30 (e.g., destination device 14 as part of a wireless communication device), and video decoder 30 may include one or more processors configured to implement techniques described in this disclosure (e.g., decode video data in accordance with techniques described in this disclosure). As another example, the apparatus or device may include a micro-processor or an integrated circuit (IC) that includes video decoder 30, and the microprocessor or IC may be part of destination device 14 or another type of device. The same may apply for video encoder 20 (i.e., an apparatus or device like source device 12 and/or a micro-controller or IC includes video encoder 20, where video encoder 20 is configured to encode video data in accordance with techniques described in this disclosure).

When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

A video sequence typically includes a series of video pictures from a view. A group of pictures (GOP) generally comprises a series of one or more video pictures. A GOP may include syntax data in a header of the GOP, a header of one or more pictures of the GOP, or elsewhere, that describes a number of pictures included in the GOP. Each picture may include picture syntax data that describes an encoding mode for the respective picture. Video encoder 20 typically operates on video blocks within individual video pictures in order to encode the video data. A video block may correspond to a macroblock, a partition of a macroblock, and possibly a sub-block of a partition, as defined in the H.264 standard. The video blocks may have fixed or varying sizes, and may differ in size according to a specified coding standard. Each video picture may include a plurality of slices. Each slice may include a plurality of blocks.

As an example, the ITU-T H.264 standard supports intra-prediction in various block sizes, such as 16 by 16, 8 by 8, or 4 by 4 for luma components, and 8×8 for chroma components, as well as inter-prediction in various block sizes, such as 16×16, 16×8, 8×16, 8×8, 8×4, 4×8 and 4×4 for luma components and corresponding scaled sizes for chroma components. In this disclosure, "N×N" and "N by N" may be used interchangeably to refer to the pixel dimensions of the block in terms of vertical and horizontal dimensions (e.g., 16×16 pixels or 16 by 16 pixels). In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

When the block is intra-mode encoded (e.g., intra-predicted), the block may include data describing an intra-prediction mode for the block. As another example, when the block is inter-mode encoded (e.g., inter-predicted), the block may include information defining a motion vector for the block. This motion vector refers to a reference picture in the same view (e.g., a temporal motion vector), or refers to a reference picture in another view (e.g., a disparity motion vector). The data defining the motion vector for a block describes, for example, a horizontal component of the motion vector, a vertical component of the motion vector, a resolution for the motion vector (e.g., one-quarter pixel precision or one-eighth pixel precision). In addition, when inter-predicted, the block may include reference index information such as a reference picture to which the motion vector points, and/or a reference picture list (e.g., RefPicList0 or RefPicList1) for the motion vector.

In the H.264 standard, following intra-predictive or inter-predictive coding, video encoder 20 calculates residual data for the macroblocks. The residual data may correspond to pixel differences between pixels of the unencoded picture and prediction values for the macroblock in H.264.

Following any transforms to produce transform coefficients, video encoder 20 performs quantization of the transform coefficients, in some examples. Quantization generally refers to a process in which transform coefficients are quantized to possibly reduce the amount of data used to represent the coefficients, providing further compression. The quantization process reduces the bit depth associated with some or all of the coefficients. For example, an n-bit value is rounded down to an m-bit value during quantization, where n is greater than m.

In some examples, video encoder 20 utilizes a predefined scan order to scan the quantized transform coefficients to produce a serialized vector that can be entropy encoded. In other examples, video encoder 20 performs an adaptive scan. After scanning the quantized transform coefficients to form a one-dimensional vector, in some examples, video encoder 20 entropy encodes the one-dimensional vector according to context adaptive variable length coding (CAVLC), context adaptive binary arithmetic coding (CABAC), syntax-based context-adaptive binary arithmetic coding (SBAC), Probability Interval Partitioning Entropy (PIPE) coding or another entropy encoding methodology, as a few examples. Video encoder 20 also entropy encodes syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

Video decoder 30 implements the inverse of the techniques of video encoder 20. For example, video decoder 30 decodes the encoded video bitstream and determines the residual blocks by inverse quantization and inverse transform. Video decoder 30 sums the residual blocks with blocks of previously decoded pictures to determine the pixel values for the blocks within the picture.

Certain techniques described in this disclosure may be performed by both video encoder 20 and video decoder 30. As one example, video encoder 20 may perform ARP as part of determining how to encode a block of video data and/or may perform ARP as part of a decoding loop in the video encoder. Video decoder 30 may perform the same techniques performed by video encoder 20 as part of decoding the video block. This disclosure may at times refer to video decoder 30 performing certain techniques described in this disclosure. It should be understood, however, that unless stated otherwise, such techniques may also be performed by video encoder 20.

As described above, the techniques described in this disclosure are directed to 3D video coding. To better understand the techniques, the following describes some H.264/AVC coding techniques, multiview video coding from the perspective of H.264/MVC extension, and the High Efficiency Video Coding (HEVC) standard, and 3D-AVC techniques.

For H.264/Advance Video Coding (AVC), video encoding or decoding (e.g., coding) is implemented on macroblocks, where a macroblock represents a portion of a frame which are inter-predicted or intra-predicted (i.e., inter-prediction encoded or decoded or intra-prediction encoded or decoded). For instance, in H.264/AVC, each inter Macroblock (MB) (e.g., inter-predicted macroblock) may be partitioned in four different ways: one 16×16 MB partition, two 16×8 MB partitions, two 8×16 MB partitions, or four 8×8 MB partitions. Different MB partitions in one MB may have different reference index values for each direction (i.e., RefPicList0 or RefPicList1). When a MB is not partitioned into multiple (more than 1) MB partitions, then the MB has only one motion vector for the whole MB partition in each direction.

As part of video coding (encoding or decoding), video encoder 20 and video decoder 30 may be configured to construct one or two reference picture lists, referred to as RefPicList0 and RefPicList1. The reference picture list(s) identify reference pictures that can be used to inter-predict macroblocks of a frame or a slice. For instance, video encoder 20 may signal a reference index and a reference picture list identifier. Video decoder 30 may receive the reference index and the reference picture list identifier and determine the reference picture that is to be used for inter-prediction decoding the current macroblock from the reference index and the reference picture list identifier.

When a MB is partitioned into four 8×8 MB partitions, each 8×8 MB partition can be further partitioned into sub-blocks. Video decoder 30 may partition an 8×8 MB partition in four different ways—one 8×8 sub-block, two 8×4 sub-blocks, two 4×8 sub-blocks, or four 4×4 sub-blocks. Each sub-block can have a different motion vector in each direction, but shares the same reference picture index for each direction. The manner in which an 8×8 MB partition is partitioned into sub-blocks is named sub-block partition.

This disclosure will generally use the term block to refer to any block of video data. For example, in the context of H.264 coding and its extensions, a block may refer to any of macroblocks, macroblock partitions, sub-blocks, or any other types of blocks. In the context of HEVC and its extensions, a block may refer to any of prediction units (PUs), transform unit (TUs), coding units (CUs), or any other types of blocks. A sub-block as used in this disclosure generally refers to any portion of a larger block. A sub-block may also itself be referred to simply as a block.

Multiple, different video coding standards support multiview video coding. To avoid confusion, when this disclosure describes multiview video coding generically, this disclosure uses the phrase "multiview video coding." Multiview video data includes a base view and one or more non-base, or dependent, views. The base view is fully decodable without reference to any of the dependent views (i.e., the base view is only inter-predicted with temporal motion vectors). This allows a codec that is not configured for multiview video coding to still receive at least one view that is fully decodable (i.e., the base view can be extracted out and the other views discarded, allowing a decoder not configured for multiview video coding to still decode the video content albeit without 3D experience). The one or more dependent views may be inter-predicted with respect to the base view or with respect to another dependent view (i.e., disparity compensation predicted), or with respect to other pictures in the same view (i.e., motion compensated predicted).

Whereas "multiview video coding" is used generically, the acronym MVC is associated with an extension of H.264/AVC. Accordingly, when the disclosure uses the acronym MVC, the disclosure is referring specifically to the extension to H.264/AVC video coding standard. The MVC extension of H.264/AVC relies upon disparity motion vectors as another type of motion vector in addition to temporal motion vectors. Another video coding standard, referred to as MVC plus depth (MVC+D), has also been developed by JCT-3V and MPEG. MVC+D applies the same low-level coding tools as those of MVC for both texture and depth, with the decoding of depth being independent to the decoding of texture and vice-versa. For instance, in MVC, a frame is represented only by one view component, referred to as a texture view component, or simply texture. In MVC+D, the video data includes two view components, referred to as a texture view component and a depth view component, or sometimes simply referred to as texture and depth. For example, in MVC+D, each view includes a texture view and a depth view, where the view includes a plurality of view components, the texture view includes a plurality of texture view components, and the depth view includes a plurality of depth view components.

Each texture view component is associated with a depth view component to form a view component of a view. The depth view component represents relative depth of the objects in the texture view component. In MVC+D, the depth view component and the texture view component are separately decodable. For example, video decoder 30 may implement two instances of an MVC codec, in which a first codec decodes the texture view components and a second codec decodes the depth view components. These two codecs can execute independent of one another because the texture view components and the depth view components are separately encoded.

In MVC+D, a depth view component is always immediately following the associated (e.g., corresponding) texture view component. In this manner, MVC+D supports texture-first coding, where the texture view component is decoded prior to the depth view component.

A texture view component and its associated (e.g., corresponding) depth view component may include the same picture order count (POC) value and view_id (i.e., the POC value and view_id of a texture view component and its associated depth view component is the same). The POC value indicates the display order of the texture view component and the view_id indicates the view to which the texture view component and depth view component belong.

Figure 2:
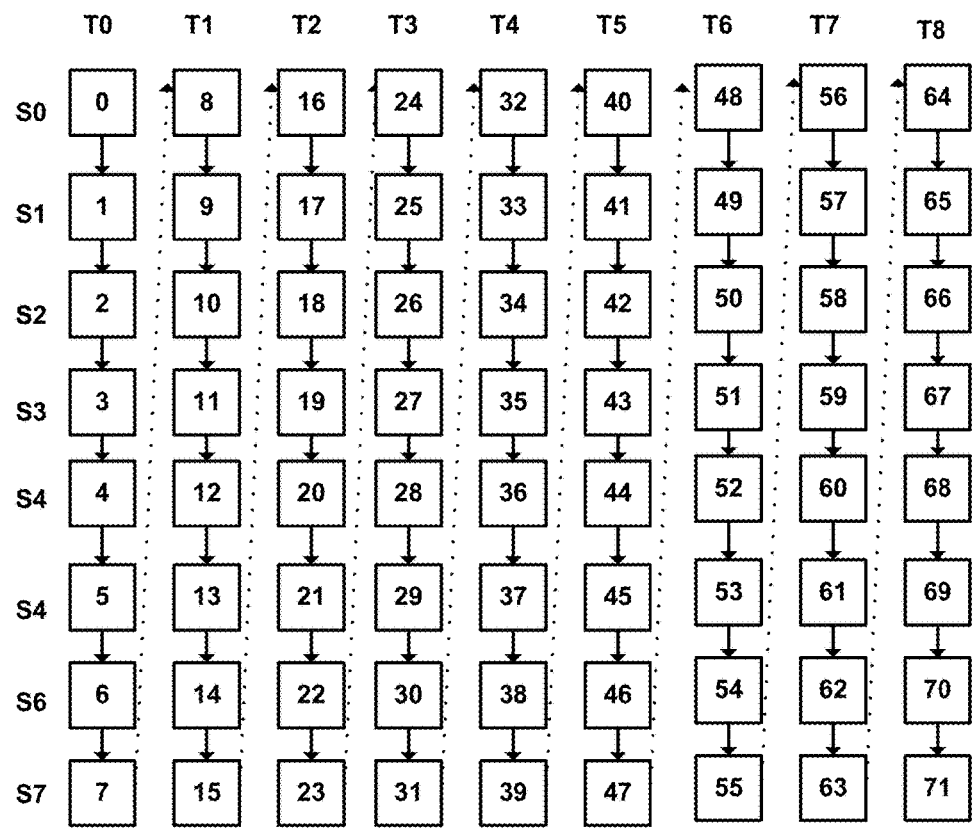
FIG. 2 is a conceptual diagram illustrating an example multiview decoding order.

FIG. 2 shows an exemplary MVC decoding order (i.e. bitstream order). The decoding order arrangement shown in FIG. 2 is referred as time-first coding. Note that the decoding order of access units may not be identical to the output or display order. In FIG. 2, S0-S7 each refers to different views of the multiview video. T0-T8 each represents one output time instance. An access unit may include the coded pictures of all the views for one output time instance. For example, a first access unit may include all of the views S0-S7 for time instance T0, a second access unit may include all of the views S0-S7 for time instance T1, and so forth.

For purposes of brevity, the disclosure may use the following definitions:

view component: A coded representation of a view in a single access unit. When a view includes both coded texture and depth representations, a view component may include a texture view component and a depth view component.

texture view component: A coded representation of the texture of a view in a single access unit.

depth view component: A coded representation of the depth of a view in a single access unit.

As discussed above, in the context of this disclosure, the view component, texture view component, and depth vide component may be generally referred to as a layer. In FIG. 2, each of the views includes sets of pictures. For example, view S0 includes set of pictures 0, 8, 16, 24, 32, 40, 48, 56, and 64, view S1 includes set of pictures 1, 9, 17, 25, 33, 41, 49, 57, and 65, and so forth. Each set includes two pictures: one picture is referred to as a texture view component, and the other picture is referred to as a depth view component. The texture view component and the depth view component within a set of pictures of a view may be considered as corresponding to one another. For example, the texture view component within a set of pictures of a view is considered as corresponding to the depth view component within the set of the pictures of the view, and vice-versa (i.e., the depth view component corresponds to its texture view component in the set, and vice-versa). As used in this disclosure, a texture view component that corresponds to a depth view component may be considered as the texture view component and the depth view component being part of a same view of a single access unit.

The texture view component includes the actual image content that is displayed. For example, the texture view component may include luma (Y) and chroma (Cb and Cr) components. The depth view component may indicate relative depths of the pixels in its corresponding texture view component. As one example analogy, the depth view component is like a gray scale image that includes only luma values. In other words, the depth view component may not convey any image content, but rather provide a measure of the relative depths of the pixels in the texture view component.

For example, a purely white pixel in the depth view component indicates that its corresponding pixel or pixels in the corresponding texture view component is closer from the perspective of the viewer, and a purely black pixel in the depth view component indicates that its corresponding pixel or pixels in the corresponding texture view component is further away from the perspective of the viewer. The various shades of gray in between black and white indicate different depth levels. For instance, a very gray pixel in the depth view component indicates that its corresponding pixel in the texture view component is further away than a slightly gray pixel in the depth view component. Because only gray scale is needed to identify the depth of pixels, the depth view component need not include chroma components, as color values for the depth view component may not serve any purpose. The above explanation is intended to be an analogy for purposes of relating depth images to texture images. The depth values in a depth image do not in fact represent shades of gray, but in fact, represent 8-bit, or other bit size, depth values.

The depth view component using only luma values (e.g., intensity values) to identify depth is provided for illustration purposes and should not be considered limiting. In other examples, any technique may be utilized to indicate relative depths of the pixels in the texture view component.

Figure 3:
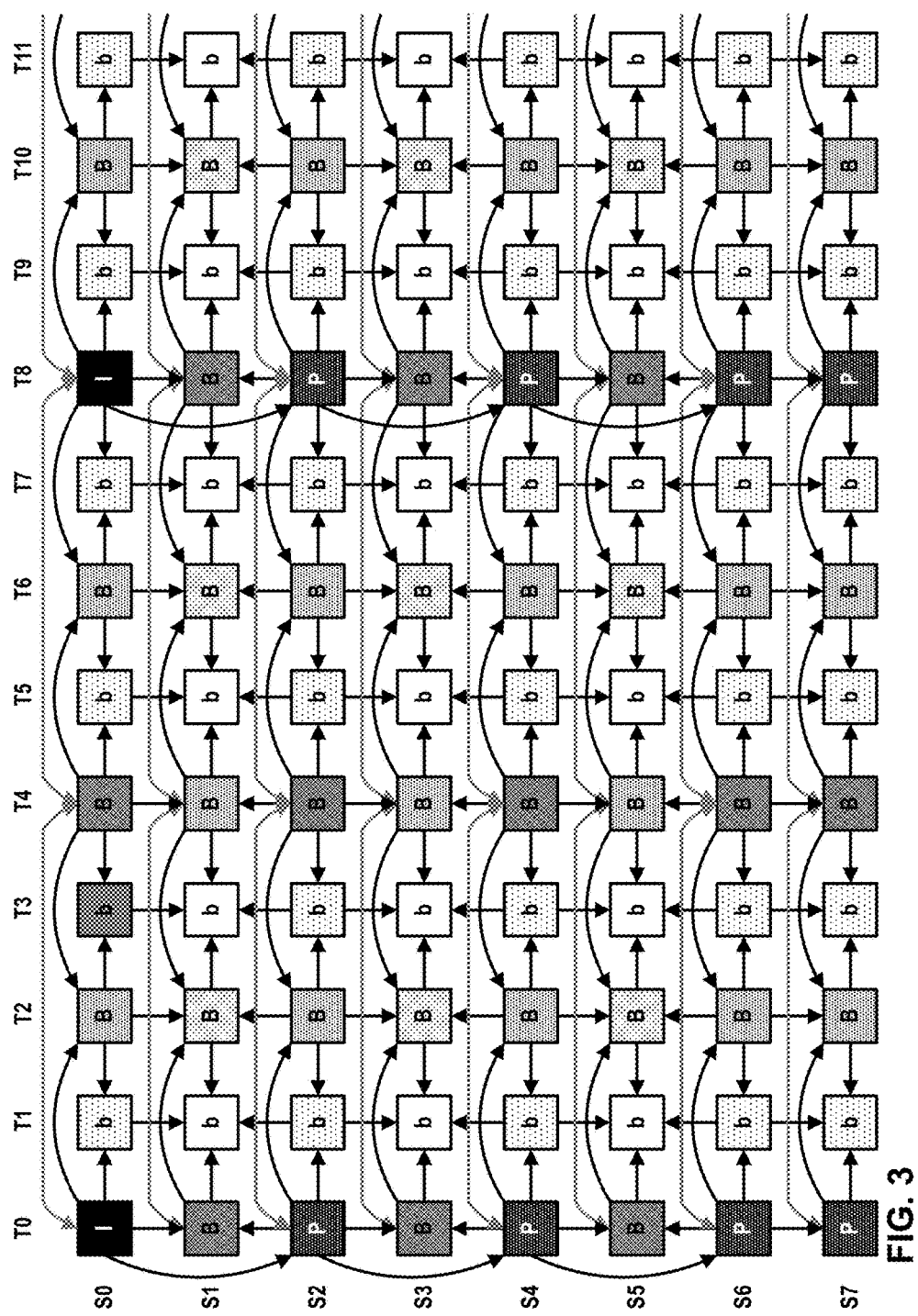
FIG. 3 is a conceptual diagram illustrating an example prediction structure for multiview coding.

FIG. 3 shows an exemplary MVC prediction structure (including both inter-picture prediction within each view and inter-view prediction between views) for multi-view video coding. Prediction directions are indicated by arrows, the pointed- to object using the pointed-from object as the prediction reference. In MVC, inter-view prediction is supported by disparity motion compensation, which uses the syntax of the H.264/AVC motion compensation, but allows a picture in a different view to be used as a reference picture.

In the example of FIG. 3, eight views (having view IDs "S0" through "S7") are illustrated, and twelve temporal locations ("T0" through "T11") are illustrated for each view. That is, each row in FIG. 3 corresponds to a view, while each column indicates a temporal location.

Although MVC has a so-called base view, which is decodable by H.264/AVC decoders, MVC also supports coding of stereo view pairs, a potential advantage of which is that MVC can support more than two views for use in 3D video. An MVC decoder can decode 3D video represented by the multiple views. A renderer of a client having an MVC decoder may render 3D video content with multiple views.

Pictures in FIG. 3 are indicated at the intersection of each row and each column. The H.264/AVC standard may use the term frame to represent a portion of the video. This disclosure may use the term picture and frame interchangeably.

The pictures in FIG. 3 are illustrated using a block including a letter, the letter designating whether the corresponding picture is intra-coded (that is, an I-picture), or inter-coded in one direction (that is, as a P-picture) or in multiple directions (that is, as a B-picture). In general, predictions are indicated by arrows, where the pointed- to pictures use the pointed-from picture for prediction reference. For example, the P-picture of view S2 at temporal location T0 is predicted from the I-picture of view S0 at temporal location T0.

As with single view video encoding, pictures of a multi-view video coding video sequence may be predictively encoded with respect to pictures at different temporal locations. For example, the I-picture of view S0 at temporal location T0 has an arrow point to the b-picture of view S0 at temporal location T1, indicating that the b-picture is predicted from the I-picture. Additionally, however, in the context of multiview video encoding, pictures may be inter-view predicted. That is, a view component can use the view components in other views for reference. In MVC, for example, inter-view prediction is realized as if the view component in another view is an inter-prediction reference. The potential inter-view references are signaled in the Sequence Parameter Set (SPS) MVC extension and can be modified by the reference picture list construction process, which enables flexible ordering of the inter-prediction or inter-view prediction references. Inter-view prediction is also a feature of proposed multiview extension of HEVC, including 3D-HEVC (multiview plus depth).

FIG. 3 provides various examples of inter-view prediction. Pictures of view S1, in the example of FIG. 3, are illustrated as being predicted from pictures at different temporal locations of view S1, as well as inter-view predicted from pictures of views S0 and S2 at the same temporal locations. For example, the b-picture of view S1 at temporal location T1 is predicted from each of the B-pictures of view S1 at temporal locations T0 and T2, as well as the b-pictures of views S0 and S2 at temporal location T1.

In some examples, FIG. 3 may be viewed as illustrating the texture view components. For example, the I-, P-, B-, and b-pictures illustrated in FIG. 2 may be considered as texture view components for each of the views. In accordance with the techniques described in this disclosure, each of the texture view components illustrated in FIG. 3 has a corresponding depth view component. In some examples, the depth view components may be predicted in a manner similar to that illustrated in FIG. 3 for the corresponding texture view components.

As discussed above, in MVC, inter-view prediction is allowed among pictures in the same access unit (meaning, in some instances, with the same time instance). When coding a picture in one of the non-base views, a picture may be added into a reference picture list, if the picture is in a different view but within a same time instance. An inter-view prediction reference picture may be put in any position of a reference picture list, just like any inter-prediction reference picture. As shown in FIG. 3, a view component can use the view components in other views for reference. In MVC, inter-view prediction is realized as if the view component in another view was an inter-prediction reference.

In MVC, inter-view prediction is allowed among pictures in the same access unit (i.e., with the same time instance). When coding a picture in one of the non-base views, a picture may be added into a reference picture list, if the picture is in a different view but with a same time instance. An inter-view prediction reference picture can be put in any position of a reference picture list, just like any inter prediction reference picture.

As shown in FIG. 3, a view component can use the view components in other views for reference. This is called inter-view prediction. In MVC, inter-view prediction is realized as if the view component in another view was an inter prediction reference.

In the context of multiview video coding, video encoder 20 and video decoder 30 may determine two types of motion vectors, one of which is a normal motion vector pointing to temporal reference pictures. The corresponding temporal inter prediction is commonly referred to as motion-compensated prediction (MCP). The other type of motion vector determined by video encoder 20 and video decoder 30 is a disparity motion vector pointing to pictures in a different view (i.e., inter-view reference pictures). The corresponding inter prediction is commonly referred to as disparity-compensated prediction (DCP).

Video encoder 20 may encode video using multiple HEVC inter coding modes, and video decoder 30 may decode video using multiple HEVC inter coding modes. The base HEVC standard supports two inter prediction modes, named merge (with skip mode being considered as a special case of merge mode) and advanced motion vector prediction (AMVP) modes for a PU. In either AMVP or merge mode, video decoder 30 maintains a motion vector (MV) candidate list with multiple motion vector predictors. Video encoder 20 signals to video decoder an index of the candidate used to code a PU. In the case, of merge mode, video decoder 30 uses the motion vector as well as the reference indexes associated with the motion vector to code a PU. In the case of AMVP, the selected motion vector serves as a predictor, and video encoder 20 signals separately a motion vector difference and a reference index. Video decoder determines the motion vector used to code a PU by adding the motion vector difference to the predictor.

Video encoder 20 and video decoder 30 are configured to generate the same MV candidate lists. The MV candidate lists generated by video encoder 20 and video decoder 30 contain, for example, up to five candidates for merge mode and only two candidates for AMVP mode. A merge candidate may contain a set of motion information, e.g., motion vectors corresponding to both reference picture lists (list 0 and list 1) and the reference indices. If a merge candidate is identified by a merge index, then video decoder 30 uses the associated motion vector as well as the reference pictures of the selected candidate for the prediction of the current blocks. However, in AMVP mode, for each potential prediction direction from either list 0 or list 1, video encoder 20 explicitly signals a reference index and a motion vector difference, together with an MVP index. As illustrated with the explanation above, a merge candidate corresponds to a full set of motion information while an AMVP candidate contains just one motion vector for a specific prediction direction.

As introduced above, video decoder 30 may decode video that coded according to the HEVC-based 3D video coding standard. Currently, a Joint Collaboration Team on 3D Video Coding (JCT-3C) of VCEG and MPEG is developing a 3DV standard based on HEVC, for which part of the standardization efforts includes the standardization of the multiview video codec based on HEVC (MV-HEVC) and another part for 3D Video coding based on HEVC (3D-HEVC). For 3D-HEVC, new coding tools, including those at the CU/PU level, for both texture and depth views may be included and supported. The latest software 3D-HTM for 3D-HEVC can be downloaded from the following link:
[3D-HTM version 9.0r1]:
https://hevc.hhi.fraunhofer.de/svn/svn_3DVCSoftware/tags/HTM-9.0r1/

One of the reference software descriptions for 3D-HEVC is as follows: Li Zhang, Gerhard Tech, Krzysztof Wegner, Sehoon Yea, "Test Model 6 of 3D-HEVC and MV-HEVC," JCT3V-F1005, Joint Collaborative Team on 3D Video Coding Extension Development of ITU-T SG 16 WP 3 and ISO/IEC JTC 1/SC 29/WG 11, 6th Meeting: Geneva, CH, November 2013. This reference software description can be downloaded from the following link:
http://phenix.it-sudparis.eu/jct2/doc_end_user/current_document.php?id=1636

One of the working draft for 3D-HEVC is as follows: Gerhard Tech, Krzysztof Wegner, Ying Chen, Sehoon Yea, "3D-HEVC Draft Text 2," JCT3V-F1001, Joint Collaborative Team on 3D Video Coding Extension Development of ITU-T SG 16 WP 3 and ISO/IEC JTC 1/SC 29/WG 11, 6th Meeting: Geneva, CH, November 2013. This version of the working draft of 3D-HEVC can be downloaded from the following link: http://phenix.it-sudparis.eu/jct2/doc_end_user/documents/6_Geneva/wg11/JCT3V-F1001-v4.zip As part of decoding video according to the HEVC standard, video decoder 30 may be configured to perform Neighboring Block Based Disparity Vector Derivation (NBDV). NBDV is a disparity vector derivation method in 3D-HEVC that uses the texture-first coding order for all the views. In the current 3D-HEVC design, the disparity vector derived from NBDV may be further refined by retrieving the depth data from reference view's depth map.

Video encoder 20 and video decoder 30 may use a disparity vector (DV) as an estimator of the displacement between two views. As neighboring blocks frequently share the same (or similar) motion/disparity information, video encoder 20 and video decoder 30 may use the motion vector information in neighboring blocks to predict a disparity vector for a current block. NBDV is coding tool used by video encoder 20 and video decoder 30 to determine neighboring disparity information for estimating the disparity vector in different views.

As part of performing NBDV, several spatial and temporal neighboring blocks are designated for checking Video decoder 30 checks the designated neighboring blocks in a pre-defined order determined by the priority of the correlation between the current block and the candidate block. Once video decoder 30 finds a disparity motion vector (i.e., the motion vector points to an inter-view reference picture) in the candidates, video decoder 30 converts the disparity motion vector to a disparity vector and also determines the associated view order index. For NDBC, two sets of neighboring blocks may be utilized, with one set being from spatial neighboring blocks and the other set being from temporal neighboring blocks.

3D-HEVC first adopted the NBDV method proposed in JCT3V-A0097. Implicit disparity vectors were included with a simplified version of NBDV in JCTVC-A0126. Additionally, JCT3V-B0047 proposed a simplified version of NBDV that removed the implicit disparity vectors stored in the decoded picture buffer and also achieved a coding gain with the RAP picture selection. The following documents describe aspects of 3D-HEVC and NDBV.

JCT3V-A0097: 3D-CE5.h: Disparity vector generation results, L. Zhang, Y. Chen, M. Karczewicz (Qualcomm)

JCT3V-A0126: 3D-CE5.h: Simplification of disparity vector derivation for HEVC-based 3D video coding, J. Sung, M. Koo, S. Yea (LG)

JCT3V-B0047: 3D-CE5.h related: Improvements for disparity vector derivation, J. Kang, Y. Chen, L. Zhang, M. Karczewicz (Qualcomm)

JCT3V-D0181: CE2: CU-based Disparity Vector Derivation in 3D-HEVC, J. Kang, Y. Chen, L. Zhang, M. Karczewicz (Qualcomm)

Figure 4:
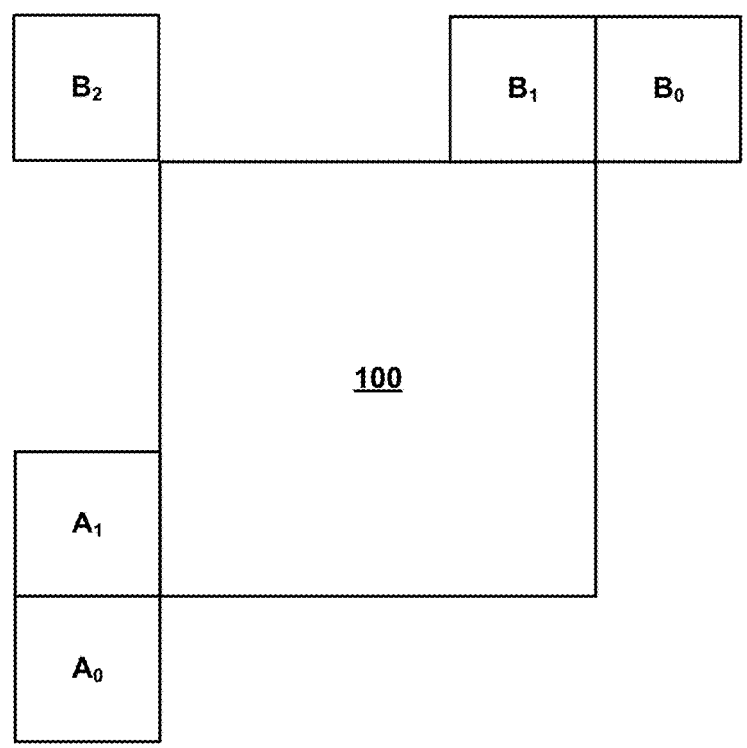
FIG. 4 shows an example of spatial neighboring blocks relative to a coding unit.

FIG. 4 shows an example of spatial motion vector neighbors relative to a coding unit 100. In some implementations of NBDV, video decoder 30 determines five spatial neighboring blocks for the disparity vector derivation. The five spatial neighbors shown in FIG. 4 are the below-left block (A0), the left block (A1), above-right block (B0), above block (B1), and above-left block (B2) of the CU covering current PU. The spatial neighbors shown in FIG. 4 correspond to the spatial neighbors used in the MERGE/AMVP modes in HEVC. Therefore, for video decoder 30 to implement NDBC, no additional memory accesses are required relative to the number of memory accesses already required when implementing the MERGE and AMVP modes of the base HEVC standard.

For checking temporal neighboring blocks, video decoder 30 performs a construction process of a candidate picture list. In some examples, up to two reference pictures from current view may be treated as candidate pictures. Video decoder 30 first inserts a co-located reference picture into the candidate picture list, followed by the rest of the candidate pictures in the ascending order of reference index. When the reference pictures with the same reference index in both reference picture lists are available, the one in the same reference picture list of the co-located picture precedes the other one. For each candidate picture in the candidate picture list, video decoder 30 determines three candidate regions for deriving the temporal neighboring blocks.

When a block is coded with inter-view motion prediction, video decoder 30 derives a disparity vector for selecting a corresponding block in a different view. An implicit disparity vector (IDV or a.k.a. derived disparity vector) refers to a disparity vector derived in the inter-view motion prediction. Even though the block is coded with motion prediction, video decoder 30 does not discard the derived disparity vector for the purpose of coding a following block.

In the current design of 3D-HTM 7.0 and later versions of 3D-HTM, the NBDV process includes checking disparity motion vectors in the temporal neighboring blocks, disparity motion vectors in the spatial neighboring blocks, and then the IDVs in order. Once the disparity motion vector or IDV is found, video decoder 30 terminates the NBDV-derivation process. Additional, in 3D-HTM 7.0 and later versions of 3D-HTM, the number of spatial neighboring blocks checked in NBDV process is further reduced to two.

Video decoder 30 may also perform refinement of NBDV (NBDV-R) by accessing depth information. When one disparity vector is derived from the NBDV process, video decoder 30 may further refine the disparity vector by retrieving the depth data from reference view's depth map. The refinement process includes two steps. First, video decoder 30 locates a corresponding depth block by the derived disparity vector in the previously coded reference depth view, such as the base view. The size of the corresponding depth block may be the same as that of current PU. Video decoder 30 then selects one depth value from four corner pixels of the corresponding depth block and converts the selected depth value to the horizontal component of the refined disparity vector. The vertical component of the disparity vector is unchanged.

In some implementations, the refined disparity vector may be used for inter-view motion prediction while the unrefined disparity vector may be used for inter-view residual prediction. In addition, the refined disparity vector may be stored as the motion vector of one PU if the PU is coded with backward view synthesis prediction mode. In some implementations, the depth view component of a base view will be always accessed regardless of the value of view order index derived from the NBDV process.

Video decoder 30 may also be configured to perform advanced residual prediction (ARP), which is a coding tool that exploits the residual correlation between views. In ARP, a residual predictor is produced by aligning the motion information at the current view for motion compensation in the reference view. In addition, weighting factors are introduced to compensate the quality differences between views. When ARP is enabled for one block, the difference between current residual and the residual predictor is signaled. Currently, ARP could only be applied to inter-coded CUs with partition mode equal to Part_2N×2N. ARP is applied for both the luma (Y) component and the chroma (Cb and Cr) component. In the following description, operation (such as sum, subtraction) on one block (or pixel) means operation on each component (Y, Cb and Cr) of each pixel in the block (or pixel). When there is a need to distinguish the process for luma and chroma components, the process for luma component is called luma ARP (sub-PU ARP) and the process for chroma components is called chroma ARP (sub-PU ARP).

Figure 5:
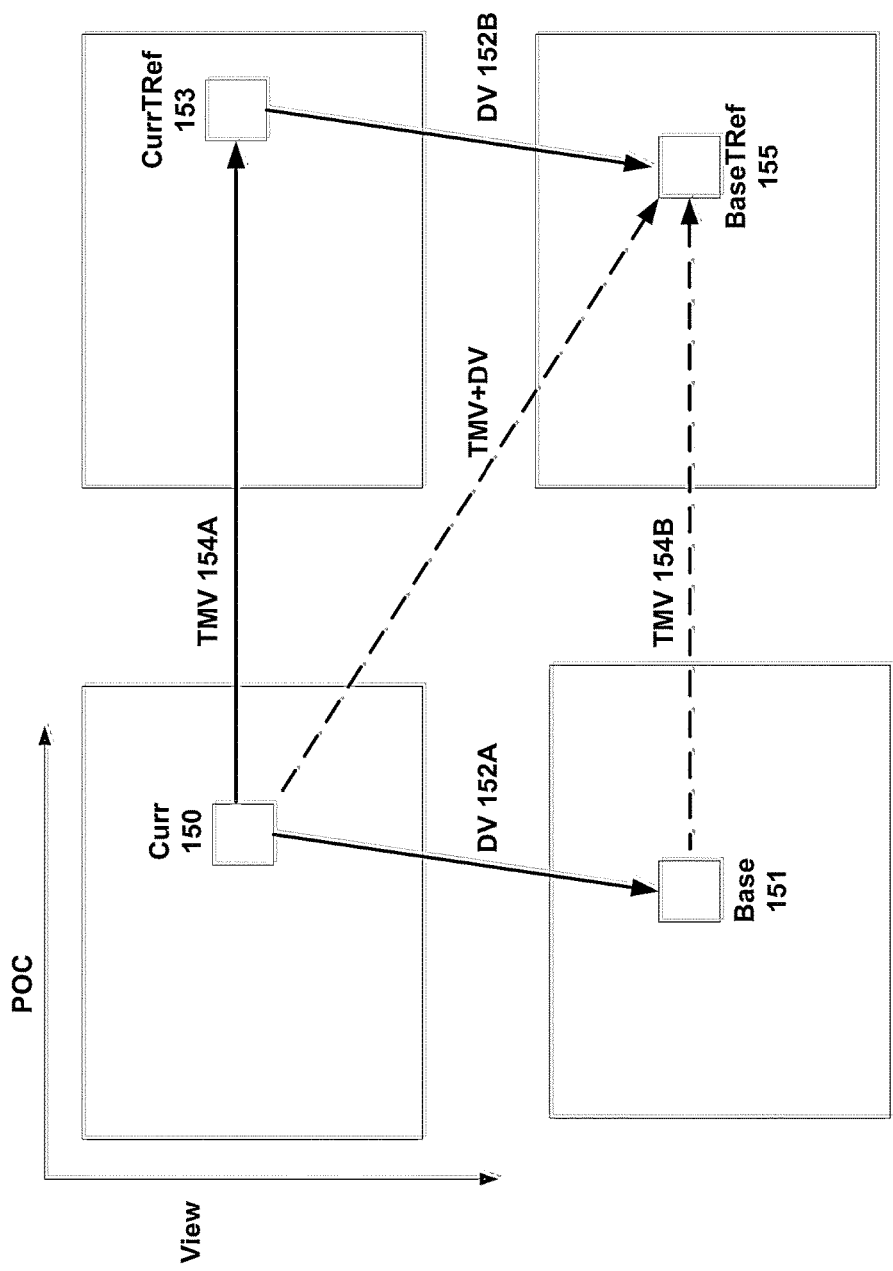
FIG. 5 shows an example prediction structure for advanced residual prediction (ARP) in 3D-HEVC.

FIG. 5 shows an example prediction structure for temporal ARP in 3D-HEVC, which was adopted in the 4$^{th}$ JCT3V meeting, as proposed in JCT3V-D0177. FIG. 5 illustrates the prediction structure of ARP for temporal residual (i.e., current reference picture in one reference picture list is a temporal reference picture) in multiview video coding.

As shown in FIG. 5, video decoder 30 identifies the following blocks in the prediction of the current block being coded. The current block is shown in FIG. 5 as Curr 150.

Base 151 represents a reference block in a reference/base view derived by the disparity vector (DV 152A). CurrTRef 153 represents a block in the same view as block Curr 150 derived by a temporal motion vector (TMV 154A) of the current block. BaseTRef 155 represents a block in the same view as block Base 151 derived by the temporal motion vector of the current block (TMV 154B). Thus, TMV 154A and TMV 154B correspond to the same motion vector, meaning TMV 154A and TMV 154B identify the same amount of displacement along the x-axis and y-axis. The difference in relative location between BaseTRef 155 and Curr 150 can be expressed with a vector of TMV+DV. The difference in relative location between CurrTRef 153 and BaseTRef 155 can be expressed by the disparity vector DV 152B. TMV+DV and DV 152B are provided in FIG. 5 to show the relationship between the various blocks and do not necessarily correspond to vectors that are derived or used by video decoder 30.

When performing temporal ARP, video decoder 30 may calculate the residual predictor as BaseTRef-Base, where the subtraction operation applies to each pixel of the denoted pixel arrays. Video decoder 30 may multiply the residual predictor by a weighting factor (w). Therefore, the final predictor of the current block determined by video decoder 30 is denoted as CurrTRef+w*(Base-BaseTRef).

The example of FIG. 5 shows the case of uni-directional prediction. When extending to the case of bi-directional prediction, video decoder 30 may apply the above steps for each reference picture list. Thus, for bi-directional prediction, video decoder 30 may determine two residual predictors for two different predictive blocks.

Figure 6:
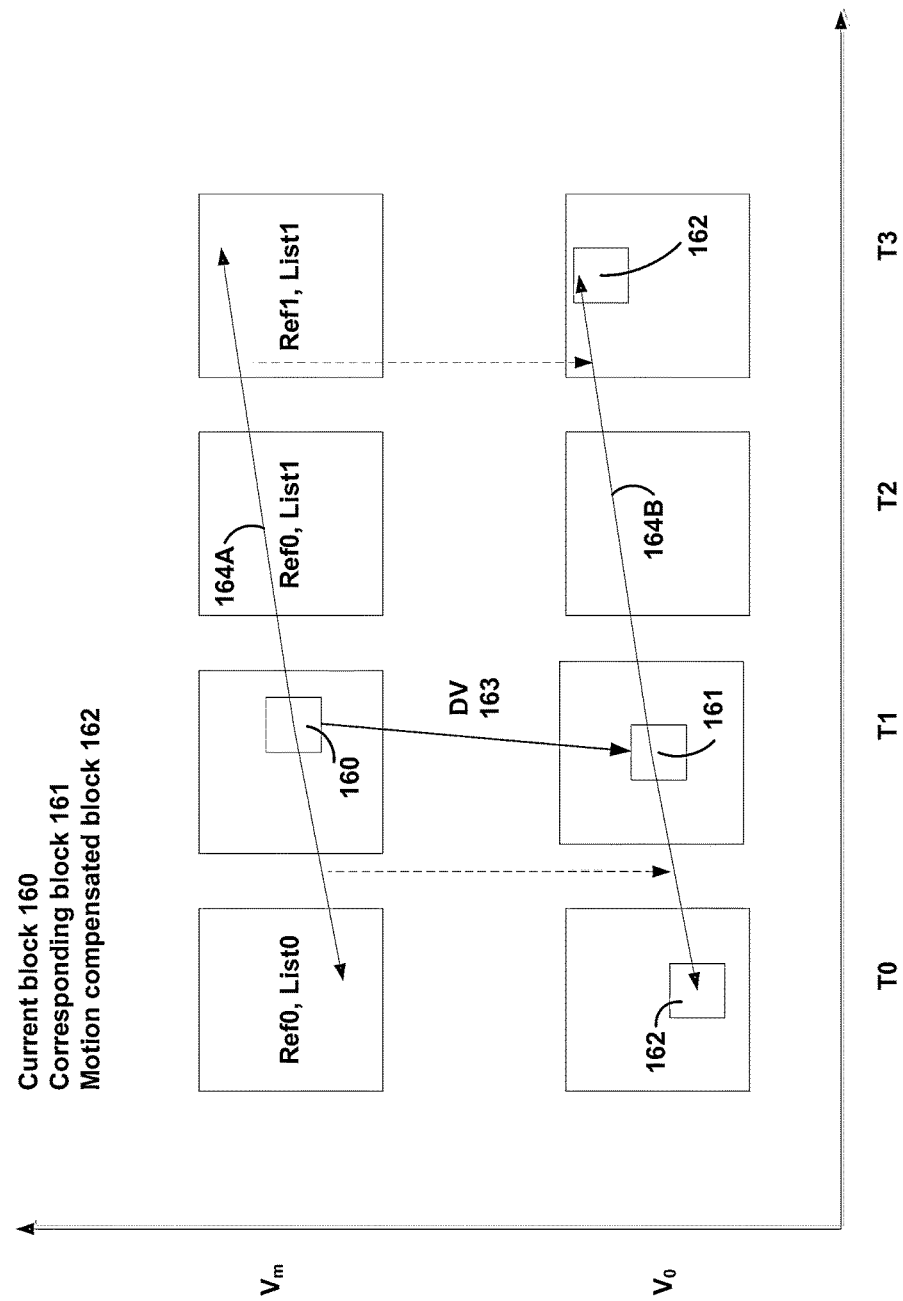
FIG. 6 shows an example relationship between a current block, reference block, and a motion compensated block in multi-view video coding.

FIG. 6 shows an example relationship between a current block 160, a corresponding block 161, and motion compensated block 162. Video decoder 30 may perform ARP by first obtaining a disparity vector (DV 163) pointing to a target reference view ($V_0$). Video decoder 30 may obtain DV 163 using, for example, any of the techniques specified in the current 3D-HEVC. In the picture of reference view $V_0$ within the same access unit, video decoder 30 may locate the corresponding block 161 using DV 163. Video decoder 30 may re-use the motion information of current block 160 to derive motion information for reference block 161. For example, if video decoder 30 used motion vector 164A was used to predict current block 160, then video decoder 30 may use motion vector 164B to predict corresponding block 161. Motion vector 164A and motion vector 164B are intended to represent two different instances of the same motion vector.

Video decoder 30 may apply motion compensation for the corresponding block 161 based on the same motion vector used to code current block 160 and derived reference picture in the reference view for the reference block, to derive a residue block. Video decoder 30 selects the reference picture in the reference view ($V_0$) which has the same POC (Picture Order Count) value as the reference picture of the current view ($V_m$) as the reference picture of the corresponding block. Video decoder 30 applies the weighting factor to the residue block to get a weighted residue block and add the values of the weighted residue block to the predicted samples.

Video decoder 30 may also be configured to perform inter-view ARP. Similar to temporal ARP, when a current PU uses an inter-view reference picture, prediction of inter-view residual is enabled. First, the inter-view residual within a different access unit is calculated, then the calculated residual information may be used to predict the inter-view residual of the current block. This technique was proposed in JCT3V-F0123 and has been adopted into 3D-HEVC.

Figure 7:
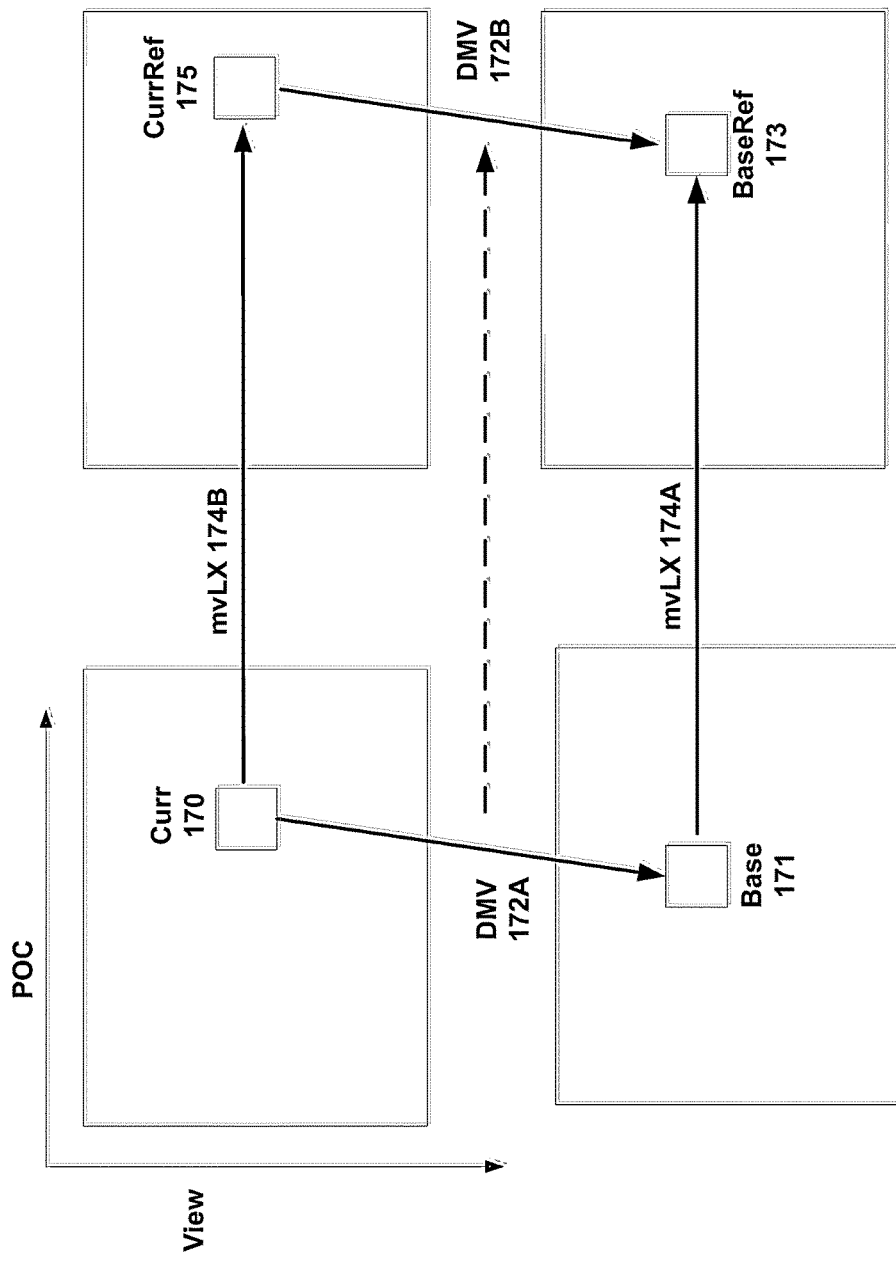
FIG. 7 shows an example of ARP for inter-view residual data.

FIG. 7 shows an example prediction structure for inter-view ARP. As shown in FIG. 7, for inter-view ARP, video decoder 30 identifies three related blocks for current block 170. Base 171 represents the reference block in the reference view located by the disparity motion vector (DMV 172A) of current block 170. BaseRef 173 represents the reference block of Base 171 in the reference view located by the temporal motion vector mvLX 174A and reference index, if available, contained by Base 171. CurrRef 175 represent a reference block in current view identified by reusing the temporal motion information from Base 171. Thus, video decoder 30 may locate CurrRef 175 using mvLX 174B, where mvLX 174A and mvLX 174B represent two instances of the same motion vector. DMV 172B is equal to DMV 172A as included in FIG. 7 to illustrate that the disparity between Curr 170 and Base 171 is equal to the disparity between CurrRef 175 and BaseRef 173. DMV 172B may not actually correspond to a disparity motion vector used or generated by video decoder 30.

With the identified three blocks, video decoder 30 may calculate the residual predictor of the residual signal for current PU (i.e. Curr 170) as the difference between CurrRef and BaseRef. Furthermore, the inter-view predictor may be multiplied by a weighting factor (w). Therefore, the final predictor of the current block (Curr 170) determined by video decoder 30 is denoted as Base+w*(CurrRef-BaseRef).

Video decoder 30 may use bi-linear filtering to generate the three relative blocks as in some known designs of ARP for temporal residual prediction. Furthermore, when the temporal motion vector contained by Base 171 points to a reference picture that is in a different access unit of the first available temporal reference picture of current PU, video decoder 30 may scale the temporal motion vector to the first available temporal reference picture and the scaled motion vector may be used to locate two blocks in a different access unit.

When ARP is applied for inter-view residual, the current PU may use inter-view ARP. When ARP is applied for temporal residual, the current PU may use temporal ARP.

In the following description, if the corresponding reference for one reference picture list is a temporal reference picture and ARP is applied, then the type of ARP is referred to as temporal ARP. Otherwise, if the corresponding reference for one reference picture list is an inter-view reference picture and ARP is applied, then the type of ARP is referred to as inter-view ARP.

As introduced above, video decoder 30 may multiply the residual predictor by a weighting factor. Three weighting factors that may be used in ARP are 0, 0.5, and 1, although more or fewer weighting factors as well as different weighting factors may also be used. Video encoder 20 may, for example, select the weighting factor leading to minimal rate-distortion cost for the current CU as the final weighting factor and signal the corresponding weighting factor index (0, 1 and 2 which correspond to weighting factor 0, 1, and 0.5, respectively) in the bitstream at the CU level. All PU predictions in one CU may share the same weighting factor. When the weighting factor is equal to 0, ARP is not used for the current CU.

Video decoder 30 may configured to perform reference picture selection via motion vector scaling. In JCT3V-C0049, the reference pictures of PUs coded with non-zero weighting factors may be different from block to block. Therefore, different pictures from the reference view may need to be accessed to generate the motion-compensated block (i.e., BaseTRef in FIG. 5) of the corresponding block. When the weighting factor is unequal to 0, for temporal residual, the motion vectors of the current PU is scaled towards a fixed picture before performing motion compensation for both residual and residual predictor generation processes. When ARP is applied to inter-view residual, the temporal motion vectors of the reference block (i.e., Base in FIG. 7) is scaled towards a fixed picture before performing motion compensation for both residual and residual predictor generation processes.

For both cases (i.e, temporal residual or inter-view residual), the fixed picture is defined as the first available temporal reference picture of each reference picture list. When the decoded motion vector does not point to the fixed picture, the motion vector may be firstly scaled and then used to identify CurrTRef and BaseTRef.

Such a reference picture used for ARP is called target ARP reference picture. Note when current slice is a B slice, the target ARP reference picture is associated with the reference picture list. Therefore, two target ARP reference pictures may be utilized.

Video decoder 30 may perform an availability check of target ARP reference pictures. The target ARP reference picture associated with one reference picture list X (with X being 0 or 1) may be denoted by RpRefPicLX, and the picture in the view with view order index equal to the one derived from NBDV process and with the same POC value of RpRefPicLX may be denoted by RefPicInRefViewLX. When one of the following conditions is false, video decoder 30 may disable ARP disabled for reference picture list X: (1) RpRefPicLX is unavailable, (2) RefPicInRefViewLX is not stored in decoded picture buffer, (3) RefPicInRefViewLX is not included in any of the reference picture lists of the corresponding block (i.e, Base in FIG. 5 and FIG. 7) located by the DV from NBDV process or DMV associated with current block, ARP may be disabled for this reference picture list.

When ARP is applied, video decoder 30 may use a bi-linear filter when generating the residual and residual predictor. That is, the three blocks exclude current block involved in the ARP process may be generated using bi-linear filter.

Video decoder 30 may also perform block-level ARP. In contrast to the above description where all blocks within one PU share the same motion information, sometimes referred to as PU-level ARP, in block-level ARP, video decoder 30 splits one PU into several 8×8 blocks, and each 8×8 block has its own motion information to perform ARP. When block-level ARP, either temporal or inter-view, is enabled, each PU is firstly split into several blocks, and each block shares the same motion information as the current PU. However, the derived motion vector (i.e., disparity vector in temporal ARP or temporal motion vector in inter-view ARP) may be updated for each 8×8 block.

Figure 8:
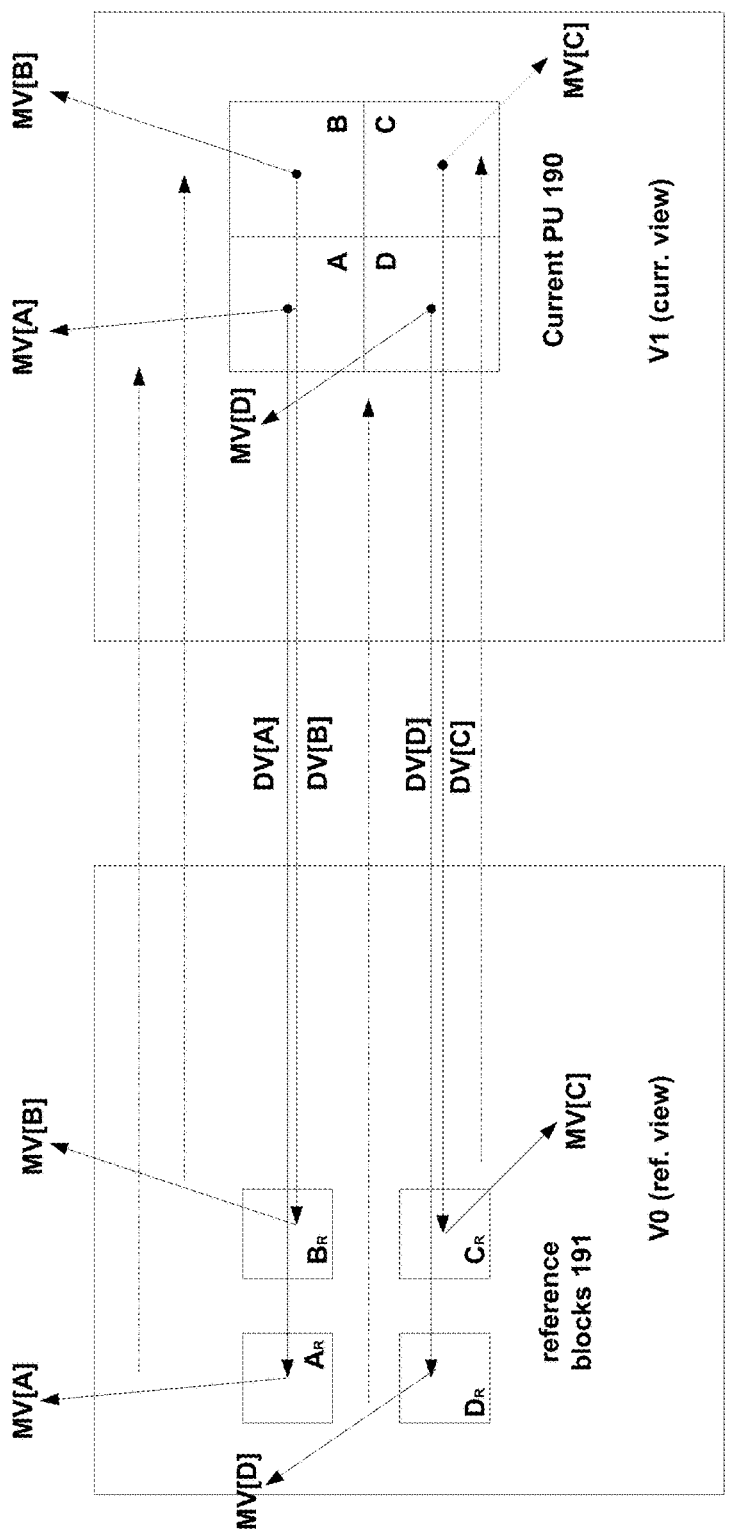
FIG. 8 shows an example prediction structure for sub-PU level inter-view motion prediction.

FIG. 8 shows an example of sub-PU level inter-view motion prediction. FIG. 8 shows a current view, referred to as V1, and a reference view, referred to as V0. Current PU 190 includes four sub-PUs A-D. Video decoder 30 may use disparity vectors of each of the four sub-PUs A-D to locate reference blocks 191, which includes four reference blocks $A_R$-$D_R$. The disparity vectors of sub-PUs A-D are shown in FIG. 8 as MV[i], where i corresponds to A-D. As each of the four sub-PUs has a unique disparity vector, the location of sub-PUs A-D relative to one another may differ than the location of reference blocks $A_R$-$D_R$ relative to one another. In sub-PU level interview motion prediction, video decoder 30 may use the motion vector of a reference block to predict a sub-PU. The motion vectors of reference blocks $A_R$-$D_R$ are shown in FIG. 8 as MV[i], where i corresponds to A-D. Thus, as one example, for sub-PU A, video decoder 30 may use DV[A] to locate reference block $A_R$, determine reference block $A_R$ was coded using MV[A], and use MV[A] to locate a predictive block for sub-PU A.

Aspects of backward view synthesis prediction in 3D-HEVC will now be described. The backward-warping VSP approach as proposed in JCT3V-C0152 was adopted in the 3rd JCT-3V meeting. The basic idea of this backward-warping VSP is the same as the block-based VSP in 3D-AVC. Both of these two techniques use the backward-warping and block-based VSP to avoid transmitting the motion vector differences and use more precise motion vectors. Implementation details are different due to different platforms.

The following paragraphs may also use the term BVSP to indicate the backward-warping VSP approach in 3D-HEVC. In 3D-HTM, the BVSP mode is only supported for an inter-code block in either skip or merge mode. BVSP mode is not allowed for a block coded in AMVP mode. Instead of transmitting a flag to indicate the usage of BVSP mode, one additional merging candidate (i.e., BVSP merging candidate) is introduced and each candidate is associated with one BVSP flag. When the decoded merge index corresponds to a BVSP merging candidate, then the current PU is coded using BVSP mode, and for each sub-block within current PU, a disparity motion vector may be derived by converting a depth value in a depth reference view.

The setting of BVSP flags may be implemented by video encoder 20 as follows. When a spatial neighboring block used for deriving a spatial merging candidate is coded with BVSP mode, the associated motion information is inherited by current block as conventional merging mode. In addition, this spatial merging candidate is tagged with a BVSP flag equal to 1. For the newly introduced BVSP merging candidate, video encoder 20 may set the BVSP flag to 1. For all the other merging candidates, video encoder 20 may set the associated BVSP flags are set to 0.

Video decoder 30 may derive a BVSP merging candidate and insert the BVSP merging candidate into the merge candidate list. Video decoder 30 may set the corresponding reference picture indices and motion vectors by the following steps. First, video decoder 30 obtains the view index denoted by refVIdxLX of the derived disparity vector using NBDV techniques as described above. Then, video decoder 30 obtains the reference picture list RefPicListX (either RefPicList0 or RefPicList1) that is associated with the reference picture with the view order index equal to refVIdxLX. Video decoder 30 uses the corresponding reference picture index and the disparity vector from NBDV process as the motion information of the BVSP merging candidate in RefPicListX.

Finally, if current slice is a B slice, then video decoder 30 checks the availability of an interview reference picture with view order index denoted by refVIdxLY unequal to refVIdxLX in the reference picture list other than RefPicListX, i.e., RefPicListY with Y being 1-X. If such a different interview reference picture is found, then video decoder 30 applies bi-predictive VSP. Meanwhile, video decoder 30 uses the corresponding reference picture index of the different interview reference picture and the scaled disparity vector from NBDV process as the motion information of the BVSP merging candidate in RefPicListY. Video decoder 30 uses the depth block from the view with view order index equal to refVIdxLX as the current block's depth information (in case of texture-first coding order), and video decoder 30 accesses the two different interview reference pictures (each from one reference picture list) via a backward warping process and applies further weighting to achieve the final backward VSP predictor. Otherwise, video decoder 30 applies uni-predictive VSP with RefPicListX as the reference picture list for prediction.

Video decoder 30 may perform a motion compensation process. In 3D-HTM, texture first coding is applied in common test conditions. Therefore, the corresponding non-base depth view is unavailable when decoding one non-base texture view. Therefore, the depth information is estimated and used to perform BVSP.

In order to estimate the depth information for a block, video decoder 30 may first derive a disparity vector from the neighboring blocks, and then use the derived disparity vector to obtain a depth block from a reference view.

The HTM 8.0 test model supports a process for deriving a disparity vector predictor, known as NBDV (Neighboring Block Disparity Vector). In the following examples, ($dv_x$, $dv_y$) denotes the disparity vector identified from NBDV function, and ($block_x$, $block_y$) denotes the current block position.

Figure 9:
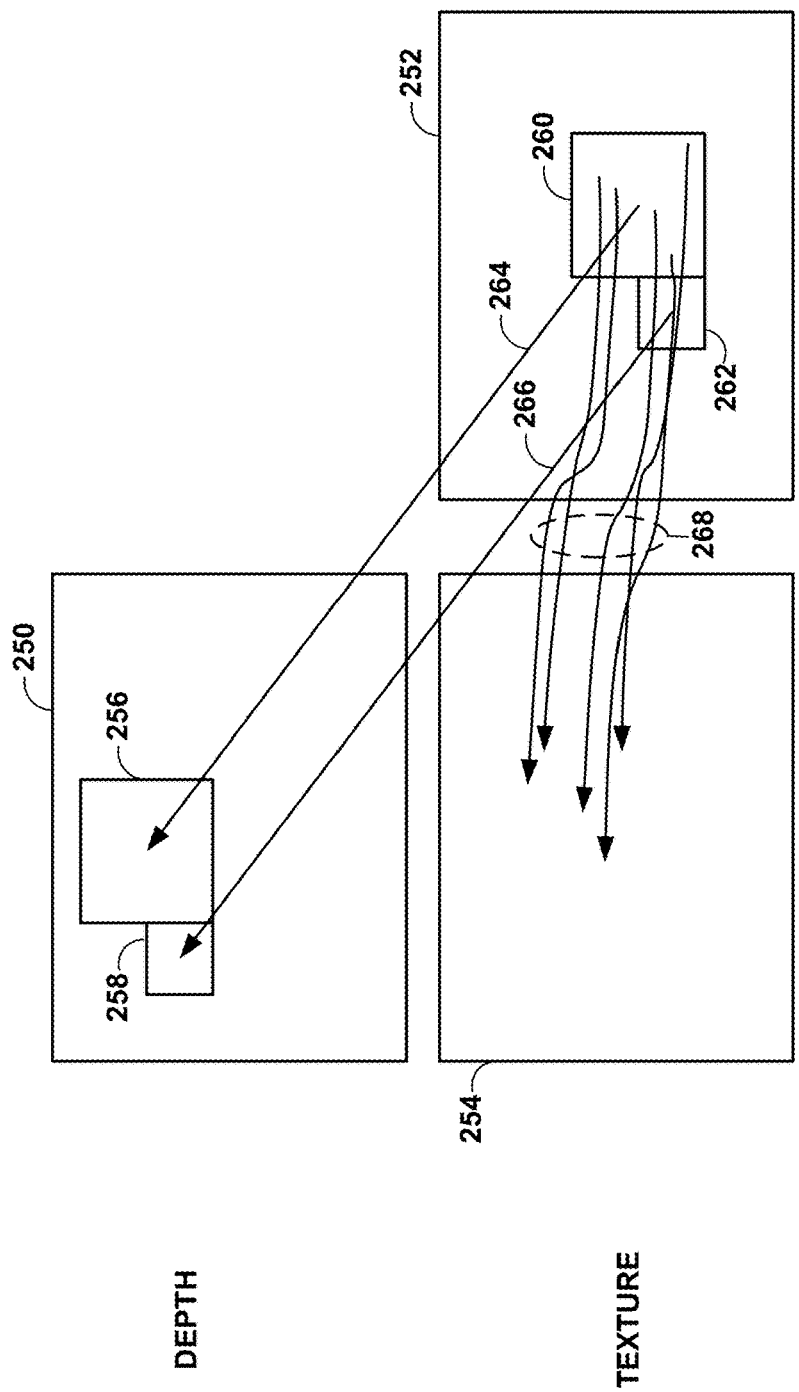
FIG. 9 is a conceptual diagram illustrating techniques related to backward view synthesis prediction (BVSP) using neighboring blocks.

Video decoder 30 may perform uni-predictive BVSP. For example, video decoder 30 may fetch a depth block with the top-left position ($block_x+dv_x$, $block_y+dv_y$) in the depth image of the reference view. The current block is firstly split into several sub-blocks with the same size equal to W*H. For each sub-block with the size equal to W*H, a corresponding depth sub-block within the fetched depth block is utilized and the maximum depth value from the four corner pixels of the depth sub-block is converted to a disparity motion vector. The derived disparity motion vector for each sub-block is then used for motion compensation. FIG. 9 illustrates the three steps on how a depth block from the reference view is located and then used for BVSP prediction.

FIG. 9 shows a depth block derivation from a reference view to do BVSP prediction. FIG. 9 is a conceptual diagram illustrating techniques related to backward view synthesis prediction (BVSP) using neighboring blocks. BVSP has been proposed, and adopted, as a technique for 3D-HEVC. The backward-warping VSP approach as proposed in JCT3V-C0152 was adopted in the 3rd JCT-3V meeting. The basic idea of this backward-warping VSP is the same as the block-based VSP in 3D-AVC. Both of these two techniques use the backward-warping and block-based VSP to avoid transmitting the motion vector differences and use more precise motion vectors. Implementation details are different due to different platforms. This disclosure generally uses the initialism BVSP to refer to backward view synthesis prediction in 3D-HEVC, although BVSP may also refer to block-based view synthesis prediction of 3D-AVC.

In 3D-HTM, texture first coding is applied in common test conditions. Therefore, the corresponding non-base depth view is unavailable when decoding one non-base texture view. Therefore, the depth information is estimated and used to perform BVSP. In order to estimate the depth information for a block, techniques have been proposed to first derive a disparity vector from the neighboring blocks, and then use the derived disparity vector to obtain a depth block from a reference view.

The HTM 5.1 test model supports a process for deriving a disparity vector predictor, known as NBDV (Neighboring Block Disparity Vector). In the following examples, (dvx, dvy) denotes the disparity vector identified from the NBDV function, and (blockx, blocky) denotes the current block position. Techniques have been proposed to fetch a depth block at (blockx+dvx, blocky+dvy) in the depth image of the reference view. The fetched depth block would have the same size of the current PU and would then be used to perform backward warping for the current PU. FIG. 6 illustrates the steps for locating a depth block from the reference view and then using the depth block for BVSP prediction.

In the example of FIG. 6, depth picture 250 and texture picture 254 correspond to the same view, while texture picture 252 corresponds to a different view. In particular, texture picture 252 includes current block 260 being coded relative to texture picture 254, acting as a reference picture. A video coder may refer to neighboring block 262, which neighbors current block 260. Neighboring block 262 includes a previously determined disparity vector 266. Disparity vector 266 may be derived as a disparity vector 264 for current block 260. Thus, disparity vector 264 refers to depth block 256 in depth picture 250 of the reference view.

The video coder may then use pixels (that is, depth values) of depth block 256 to determine disparity values 268 for pixels (that is, texture values) of current block 260, for performing backward warping. The video coder may then synthesize values for a predicted block (i.e., a BVSP reference block) for current block 260 from the pixels identified by disparity values 268. The video coder may then predict current block 260 using this predicted block. For instance, during video encoding by video encoder 20, video encoder 20 may calculate pixel-by-pixel differences between the predicted block and current block 260 to produce a residual value, which video encoder 20 may then transform, quantize, and entropy encode. On the other hand, during video decoding by video decoder 30, video decoder 30 may entropy decode, inverse quantize, and inverse transform residual data, then combine the residual data (on a pixel-by-pixel basis) with the predicted block to reproduce current block 260.

Video decoder 30 may perform Bi-prediction BVSP. When RefPicList0 and RefPicList1 includes multiple interview reference pictures from different views, video decoder 30 may apply bi-predictive VSP. That is, video decoder 30 may generate the two VSP predictors from each reference list, as described above. Video decoder 30 may then average the two VSP predictors to obtain the final VSP predictor.

Video decoder 30 may determine motion compensation sizes for BVSP. The motion compensation size, i.e., W*H as described above could be either 8×4 or 4×8. To determine the motion compensation size, the following rule is applied:

For each 8×8 block, 4 corners of corresponding depth 8×8 block are checked and:

if (vdepth[TL]<vdepth[BR]?0:1)!=(vdepth[TR]<vdepth[BL]?0:1)
  use 4×8 partition (W=4, H=8)
else
  use 8×4 partition (W=8, H=4)

Figure 10:
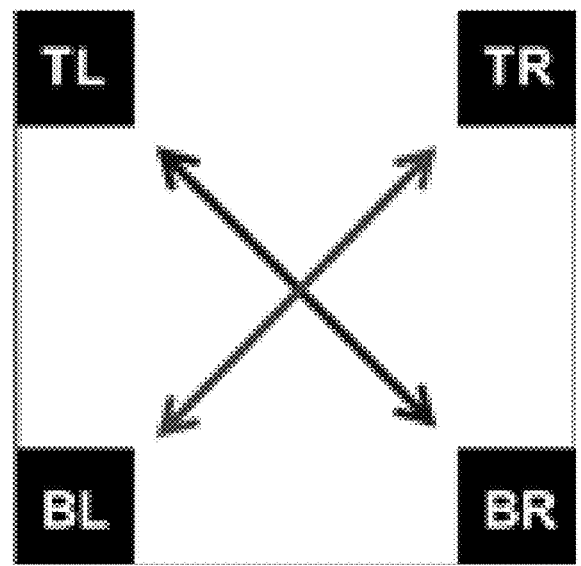
FIG. 10 shows an example of four corner pixels of one 8×8 depth block.

FIG. 10 shows an example of the four corner pixels of one 8×8 depth block that may be checked by video decoder 30. The four corner samples are the top-left sample (TL), top-right sample (TR), bottom-right sample (BR), and bottom-left sample (BL).

Video decoder 30 may perform illumination compensation. A linear illumination compensation model is utilized to adapt luminance and chrominance of inter-view predicted blocks to the illumination of the current view. The parameters (including scaling factor a close to 1 and an offset b) of the linear model are estimated for each CU using reconstructed neighboring samples of the current block and of the reference block used for prediction. The corresponding neighboring samples in the reference view are identified by the disparity motion vector of the current PU, as shown in FIG. 11.

Figure 11:
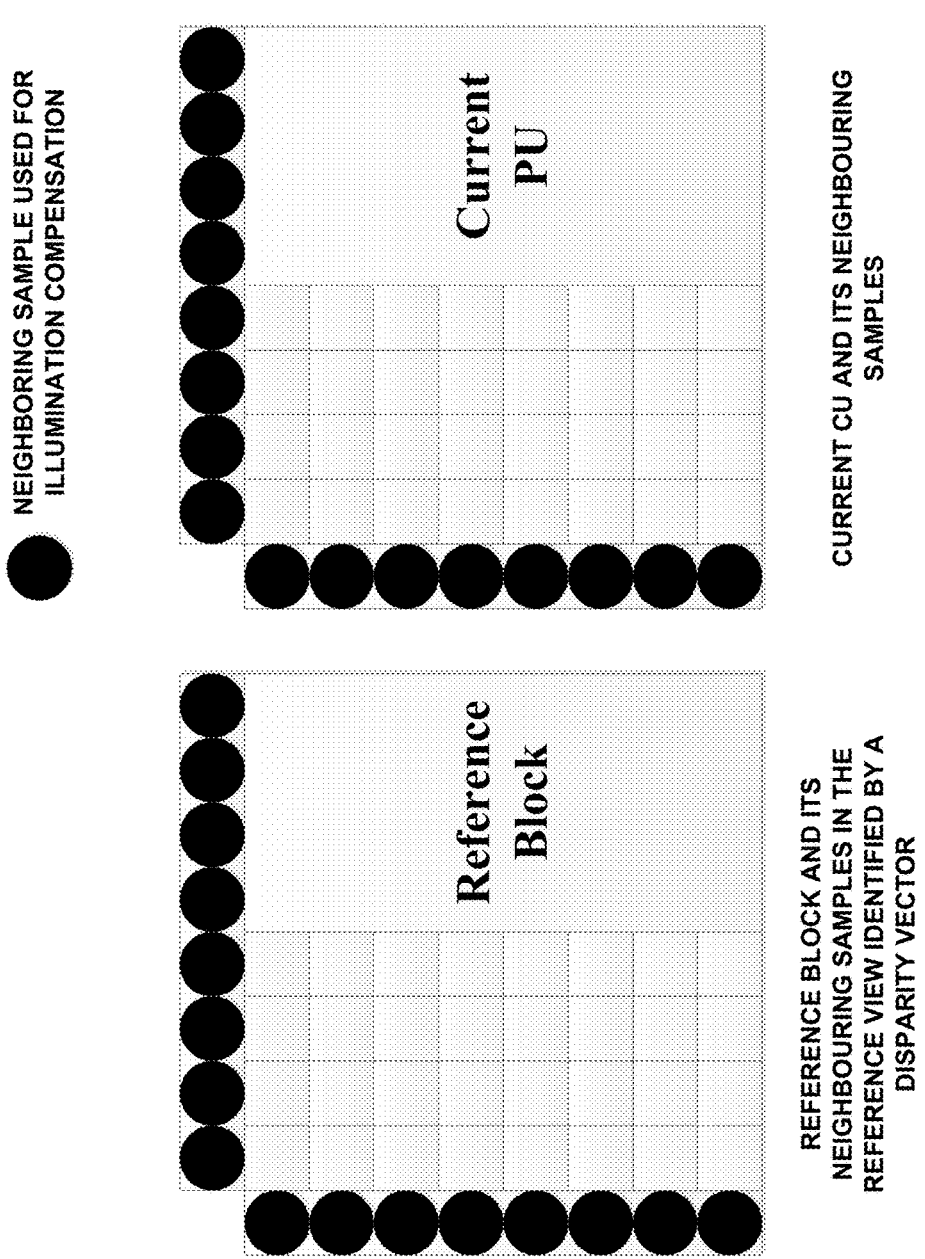
FIG. 11 shows an example of neighboring samples for the derivation of illumination compensation parameters.

FIG. 11 shows an example of neighboring samples for the derivation of illumination compensation parameters. Video decoder 30 may be configured to perform inter-view motion prediction for depth views. JCT3V-F0125 proposes techniques to derive more candidates from the already coded motion vectors of the reference depth views. To derive the merge candidates, video decoder 30 first derives a disparity vector from the neighboring reconstructed depth values. Then, video decoder 30 derives additional merge candidates based on this derived disparity vector and adds the additional merge candidates into the merge candidate list.

Video decoder 30 may construct a merge candidate according to a candidate list construction process. As part of the candidate list construction process, video decoder 30 may first derive an MPI using procedures described above. If the MPI is available, then video decoder 30 inserts the MPI into the merge list. Next, if the inter-view IPMC derived from the base view is available and is different from the MPI candidate, then video decoder 30 inserts the inter-view IPMC into the merge candidate list. Otherwise, video decoder 30 does not insert the IPMC into the list. Next, video decoder 30 inserts the spatial merging candidates (SMC) $A_1$ and $B_1$ into the merge candidate list as described in the current design. Next, video decoder 30 converts the disparity vector into a disparity motion vector and inserts the disparity motion vector into the list, if the disparity motion vector is different from the spatial candidates $A_1$ and $B_1$. Otherwise, the disparity motion vector is not inserted in the list. Next, video decoder 30 adds SMC $B_0$, $A_0$ and $A_2$ into the merge candidate list as described in the current design. Next, if an IPMC was derived to be an additional candidate, then video decoder 30 compares the IPMC with the inter-view IPMC derived in step 2. If this IPMC is not equal to the inter-view IPMC in step 2 or if the additional candidate is a DSMV (when the additional IPMC is unavailable), then video decoder 30 inserts the generated additional candidate into the merge list. Finally, video decoder 30 may add other motion vector merging candidates (e.g. temporal/combined bi-predictive/zero motion vector merging candidates) to the merge candidate list if the number of valid candidates is less than the maximum number.

It should be noted that with the candidate list construction process described above, the candidate list size may not be changed (i.e. the list may still include six candidates). Once the candidate list includes enough candidates, video decoder 30 terminates the list construction process and no additional candidates are added. Video decoder 30 may implement other techniques for deriving a disparity vector for depth views.

Syntax table and semantics for implementing above described techniques will now be described. Video encoder 20 represents an example of a video encoder configured to generate such syntax, and video decoder 30 represents an example of video decoder configured to receive and parse such syntax. In JCT3V-G1001, the syntax table for the view parameter set (VPS) was defined as follows:

Syntax Table
I.7.3.2.1.2 Video Parameter Set Extension 2 Syntax

| | Descriptor |
|---|---|
| vps_extension2( ) { | |
|   while( !byte_aligned( ) ) | |
|     vps_extension_byte_alignment_reserved_one_bit | u(1) |
|   for( i = 0; i <= vps_max_layers_minus1; i++ ) { | |
|     layerId = layer_id_in_nuh[ i ] | |
|     if ( layerId != 0) { | |
|       iv_mv_pred_flag[ layerId ] | u(1) |
|       log2_sub_pb_size_minus3[ layerId ] | ue(v) |
|       if ( !VpsDepthFlag[ layerId ] ) { | |
|         iv_res_pred_flag[ layerId ] | u(1) |
|         depth_refinement_flag[ layerId ] | u(1) |
|         view_synthesis_pred_flag[ layerId ] | u(1) |
|         depth_based_blk_part_flag[ layerId ] | |
|       } else { | |
|         mpi_flag[ layerId ] | u(1) |
|         vps_depth_modes_flag[ layerId ] | u(1) |
|         lim_qt_pred_flag[ layerId ] | u(1) |
|         vps_inter_sdc_flag[ layerId ] | u(1) |
|       } | |
|     } | |
|   } | |
|   cp_precision | ue(v) |
|   for( i = 0; i < NumViews; i++ ) { | |
|     cp_present_flag[ i ] | u(1) |
|     if( cp_present_flag[ i ] ) { | |
|       cp_in_slice_segment_header_flag[ i ] | u(1) |
|       if( !cp_in_slice_segment_header_flag[ i ] ) | |
|         for( j = 0; j < i; j++ ){ | |
|           vps_cp_scale[ i ][ j ] | se(v) |
|           vps_cp_off[ i ][ j ] | se(v) |
|           vps_cp_inv_scale_plus_scale[ i ][ j ] | se(v) |
|           vps_cp_inv_off_plus_off[ i ][ j ] | se(v) |
|         } | |
|     } | |
|   } | |
|   iv_mv_scaling_flag | u(1) |
|   log2_mpi_sub_pb_size_minus3 | ue(v) |
| } | |

JCT3V-G1001 disclosed the following regarding the video parameter set extension 2 semantics:
Semantics
I.7.4.3.1.2 Video Parameter Set Extension 2 Semantics
iv_mv_pred_flag[layerId] indicates whether inter-view motion parameter prediction is used in the decoding process of the layer with nuh_layer_id equal to layerId. iv_mv_pred_flag[layerId] equal to 0 specifies that inter-view motion parameter prediction is not used for the layer with nuh_layer_id equal to layerId. iv_mv_pred_flag[layerId] equal to 1 specifies that inter-view motion parameter prediction may be used for the layer with nuh_layer_id equal to layerId. When not present, the value of iv_mv_pred_flag[layerId] is inferred to be equal to 0.

log 2_sub_pb_size_minus3[layerId] specifies the value of the variable SubPbSize[layerId] that is used in the decoding of prediction units using the inter-view merge candidate. The value of log 2_sub_pb_size_minus3 shall be in the range of (MinCbLog2SizeY−3) to (CtbLog2SizeY−3), inclusive.

iv_res_pred_flag[layerId] indicates whether inter-view residual prediction is used in the decoding process of the layer with nuh_layer_id equal to layerId. iv_res_pred_flag[layerId] equal to 0 specifies that inter-view residual prediction is not used for the layer with nuh_layer_id equal to layerId. iv_res_pred_flag[layerId] equal to 1 specifies that inter-view residual prediction may be used for the layer with nuh_layer_id equal to layerId. When not present, the value of iv_res_pred_flag[layerId] is to be equal to 0.

view_synthesis_pred_flag[layerId] equal to 0 specifies that view synthesis prediction merge candidates are not used for the layer with nuh_layer_id equal to layerId. view_synthesis_pred_flag[layerId] equal to 1 specifies that view synthesis prediction merge candidates might be used for the layer with nuh_layer_id equal to layerId. When not present, the value of view_synthesis_pred_flag[layerId] is inferred to be equal to 0.

depth_refinement_flag[layerId] equal to 0 specifies that depth view components are not used in the derivation process for a disparity vector for the layer with nuh_layer_id equal to layerId. depth_refinement_flag[layerId] equal to 1 specifies that depth components are used in the derivation process for a disparity vector for the layer with nuh_layer_id equal to layerId. When not present, the value of depth_refinement_flag[layerId] is inferred to be equal to 0.

iv_mv_scaling_flag equal to 1 specifies that motion vectors used for inter-view prediction in a layer with nuh_layer_id equal to layerId may be scaled based on ViewId[layerId] values. iv_mv_scaling_flag equal to 0 specifies that motion vectors used for inter-view prediction in a layer with nuh_layer_id equal to layerId are not scaled based on ViewId[layerId] values. When not present, the value of iv_mv_scaling_flag is inferred to be equal to 0.

log 2_mpi_sub_pb_size_minus3 specifies the value of the variable MpiSubPbSize that is used in the decoding of prediction units using the texture merge candidate. The value of log 2_mpi_sub_pb_size_minus3 shall be in the range of (MinCbLog2SizeY−3) to (CtbLog2SizeY−3), inclusive.

The variable MpiSubPbSize is derived as specified in the following:

$$MpiSubPbSize=1<<(\log 2\_mpi\_sub\_pb\_size\_minus3+3) \quad (I-8)$$

Video decoder 30 may be configured to disable the temporal inter-view MV candidate and the VSP candidate. JCT3V-G0067 proposed to disable the temporal inter-view MV candidate (including sub-PU temporal inter-view MV candidate and shifted temporal inter-view MV candidate) and VSP candidate when the current reference lists include no inter-view picture, which results in the unavailability of reference views for deriving a DV using an NBDV process.

The proposed working draft changes on top of JCT3V-F1001 are shown with a <u>singleunderline</u>:

H.8.5.3.2.11 Derivation Process for a Temporal Inter-View Motion Vector Candidate This process is not invoked when iv_mv_pred_flag [nuh_layer_id] is equal to 0. Inputs to this process are:
 a luma location (xPb, yPb) of the top-left luma sample of the current prediction unit relative to the top-left luma sample of the current picture,
 variables nPbW and nPbH specifying the width and the height, respectively, of the current prediction unit,
 a prediction list indication X,
 a reference view index refViewIdx.
 a disparity vector mvDisp,
Outputs of this Process are:
 a flag availableFlagLXInterView specifying whether the temporal inter-view motion vector candidate is available,
 a temporal inter-view motion vector candidate mvLXInterView,
 a reference index refIdxLX specifying a reference picture in the reference picture list RefPicListX, The flag availableFlagLXInterView is set equal to 0, the variable refIdxLX is set equal to −1, and both components of mvLXInterView are set equal to 0.

<u>WhentherefViewIdxisequalto−1,thewholedecodingprocessspecifiedinthissubclauseterminates.</u>

When X is equal to 1 and the current slice is not a B slice the whole decoding process specified in this subclause terminates.

The reference layer luma location (xRef, yRef) is derived by $$xRefFull=xPb+(nPbW>>1)+((mvDisp[0]+2)>>2) \quad (H-122)$$

$$yRefFull=yPb+(nPbH>>1)+((mvDisp[1]+2)>>2) \quad (H-123)$$

$$xRef=Clip3(0,PicWidthInSamples_L-1,(xRefFull>>3)<<3) \quad (H-124)$$

$$yRef=Clip3(0,PicHeightInSamples_L-1,(yRefFull>>3)<<3) \quad (H-125)$$

The variable ivRefPic is set equal to the picture with ViewIdx equal to refViewIdx in the current access unit.

. . .

H.8.5.3.2.13 Derivation Process for a View Synthesis Prediction Merge Candidate

Inputs to this process are:
 a luma location (xCb, yCb) of the top-left sample of the current luma coding block relative to the top-left luma sample of the current picture,
Outputs of this process are
 the availability flag availableFlagVSP whether the VSP merge candidate is available,
 the reference indices refIdxL0VSP and refIdxL1VSP,
 the prediction list utilization flags predFlagL0VSP and predFlagL1VSP,
 the motion vectors mvL0VSP and mvL1VSP.

The variable availableFlagVSP is set equal to 1, the variables predFlagL0VSP and predFlagL1VSP are set equal to 0, the variables refIdxL0VSP and refIdxL1VSP are set equal to −1 and the variable refViewAvailableFlag is set equal to 0.

<u>WhenRefViewIdx[xCb][yCb]isequalto−1,thevariable availableFlagVSPissetequalto0andthewholedecodingprocessspecifiedinthissubclauseterminates.</u>

For X in the range of 0 to 1, inclusive, the following applies:
 For i in the range of 0 to NumRefPicsLX−1, inclusive, the following applies:
  When refViewAvailableFlag is equal to 0 and ViewIdx(RefPicListX[i]) is equal to RefViewIdx [xCb][yCb], the following applies:

$$refViewAvailableFlag=1 \quad (H-133)$$

$$predFlagLXVSP=1 \quad (H-134)$$

$$mvLXVSP=MvDisp[xCb][yCb] \quad (H-135)$$

$$refIdxLXVSP=i \quad (H-136)$$

$$Y=1-X \quad (H-137)$$

When the current slice is a B slice and refViewAvailableFlag is equal to 1, refViewAvailableFlag is set equal to 0 and the following applies:
 For i in the range of 0 to NumRefPicsLY−1, inclusive, the following applies.
 . . .

The corresponding changes are reflected in JCT3V-G1001 in a different manner. The changes are shown below with additions being indicated with singleunderline.

I.8.5.3.2.1 Derivation Process for Luma Motion Vectors for Merge Mode

This process is only invoked when MergeFlag[xPb][yPb] is equal to 1, where (xPb, yPb) specify the top-left sample of the current luma prediction block relative to the top-left luma sample of the current picture.

Inputs to this process are:

. . .

Outputs of this Process are:

. . .

The function differentMotion(N, M) is specified as follows:

If one of the following conditions is true, differentMotion (N, M) is equal to 1:
predFlagLXN !=predFlagLXM (with X being replaced by 0 and 1),
mvLXN !=mvLXM (with X being replaced by 0 and 1),
refIdxLXN !=refIdxLXM (with X being replaced by 0 and 1), Otherwise, differentMotion(N, M) is equal to 0.

The motion vectors mvL0 and mvL1, the reference indices refIdxL0 and refIdxL1, and the prediction utilization flags predFlagL0 and predFlagL1 are derived by the following ordered steps:

1. The derivation process for the base merge candidate list as specified in subclause 0 is invoked with the luma location (xCb, yCb), the luma location (xPb, yPb), the variables nCbS, nPbW, nPbH, and the partition index partIdx as inputs, and the output being a modified luma location (xPb, yPb), the modified variables nPbW and nPbH, the modified variable partIdx, the luma location (xOrigP, yOrigP), the variables nOrigPbW and nOrigPbH, the merge candidate list baseMergeCandList, the luma motion vectors mvL0N and mvL1N, the reference indices refIdxL0N and refIdxL1N, and the prediction list utilization flags predFlagL0N and predFlagL1N, with N being replaced by all elements of baseMergeCandList.

2. For N being replaced by $A_1$, $B_1$, $B_0$, $A_0$ and $B_2$, the following applies:
If N is an element in baseMergeCandList, availableFlagN is set equal to 1.
Otherwise (N is not an element in baseMergeCandList), availableFlagN is set equal to 0.

3. Depending on iv_mv_pred_flag[nuh_layer_id] andDispAvailabilityIdc[xPb][yPb], the following applies:
If iv_mv_pred_flag[nuh_layer_id] is equal to 0 orDispAvailabilityIdc[xPb][yPb]isequaltoDISP_NONE, the flags availableFlagIvMC, availableIvMCShift and availableFlagIvDC are set equal to 0.
Otherwise (iv_mv_pred_flag[nuh_layer_id] is equal to 1), the derivation process for the inter-view merge candidates as specified in subclause I.8.5.3.2.10 is invoked with the luma location (xPb, yPb), the variables nPbW and nPbH as inputs, and the output is assigned to the availability flags availableFlagIvMC, availableIvMCShift and availableFlagIvDC, the reference indices refIdxLXIvMC, refIdxLXIvMCShift and refIdxLXIvDC, the prediction list utilization flags predFlagLXIvMC, predFlagLXivMCShift and predFlagLXIvDC, and the motion vectors mvLXIvMC, mvLXIvMCShift and mvLXIvDC (with X being 0 or 1, respectively).

4. Depending on view_synthesis_pred_flag[nuh_layer_id] andDispAvailabilityIdc[xPb][yPb], the following applies:
If view_synthesis_pred_flag[nuh_layer_id] is equal to 0 orDispAvailabilityIdc[xPb][yPb]isequaltoDISP_NONE, the flag availableFlagVSP is set equal to 0.
Otherwise (view_synthesis_pred_flag[nuh_layer_id] is equal to 1), the derivation process for a view synthesis prediction merge candidate as specified in subclause I.8.5.3.2.13 is invoked with the luma locations (xPb, yPb) and the variables nPbW and nPbH as inputs, and the outputs are the availability flag availableFlagVSP, the reference indices refIdxL0VSP and refIdxL1VSP, the prediction list utilization flags predFlagL0VSP and predFlagL1VSP, and the motion vectors mvL0VSP and mvL1VSP.

5. Depending on mpi_flag[nuh_layer_id], the following applies:
If mpi_flag[nuh_layer_id] is equal to 0, the variables availableFlagT and availableFlagD are set equal to 0.
Otherwise (mpi_flag[nuh_layer_id] is equal to 1), the derivation process for the texture and the disparity derived merging candidates as specified in subclause I.8.5.3.2.14 is invoked with the luma location (xPb, yPb), the variables nPbW and nPbH as inputs, and the outputs are the flags availableFlagT and availableFlagD, the prediction utilization flags predFlagLXT, and predFlagLXD, the reference indices refIdxLXT and refIdxLXD, the motion vectors mvLXT and mvLXD (with X being 0 or 1, respectively), and the variable dispDerivedDepthVal.

Here, the variable DispAvailabilityIdc is defined as follows in the CU-level NBDV process (I.8.5.5 in JCT3V-G1001):

$$Disp\text{AvailabilityIdc}[x][y] = dv\text{AvailFlag?DISP\_AVAILABLE: (DefaultRefViewIdxAvailableFlag?DISP\_DEFAULT:DISP\_NONE)} \qquad (1\text{-}266)$$

wherein dvAvailFlag indicates whether there is one disparity motion vector from the spatial or temporal neighboring blocks used in the NBDV process and DefaultRefViewIdxAvailableFlag is used to indicate whether current slice has at least one inter-view reference picture.

When and only when current slice does not include any inter-view reference pictures, the value of DispAvailabilityIdc[x][y] is set to DISP_NONE.

Existing techniques for merge list construction, some of which have been discussed above, suffer from several potential problems. For example, the merge list construction techniques described in JCT3V-G0067 for 3D-HEVC have several potential problems. As a first example, during the merge list construction process for each PU, additional conditions are added to check the availability of inter-view reference pictures depending on the value of DispAvailabilityIdc, although such information is the same for all PUs within one slice. As another example, the condition check of DispAvailabilityIdc happens multiple times during one invocation of the merge list construction process. However, if the availability can be known beforehand, many condition checks may be able to be avoided. As another example, some slice-level decoding processes are invoked even when a current slice includes no inter-view reference pictures. This unnecessary invocation of decoding processes increases the decoder complexity. Such decoding processes include the derivation process for the candidate picture list for disparity vector derivation, the alternative target reference index for TMVP in merge mode, default reference view order index for disparity derivation, and the target reference index for residual prediction. This disclosure provides potential solutions to solve some of the above mentioned problems for 3D-HEVC when a current slice includes no inter-view reference pictures.

According to a first technique of this disclosure, instead of checking both the VPS flag (such as iv_mv_pred_flag [layerId], view_synthesis_pred_flag[layerId]) and the availability of inter-view reference pictures for each prediction unit (i.e., DispAvailabilityIdc[xPb][yPb] is equal to DISP_NONE) to determine whether a certain merge candidate (inter-view/shifted disparity merging candidate or view synthesis prediction merge candidate) should be generated, video decoder 30 may determine a variable or condition only at the slice level and use this determination to control whether the decoding processes, i.e., the derivation process for the inter-view/shifted disparity merging candidate, view synthesis prediction merge candidate, are to be inovked or not. By making this determination at the slice level, video decoder 30 does not need to check inter-view reference picture availability at the block level.

Video decoder 30 may derive the slice level variable or condition from the VPS flag and the availability of inter-view reference pictures of the current slice. In one example, video encoder 20 may set a variable ivMvPredPosFlag (indicating whether inter-view motion prediction is possible for the current slice due to e.g., configurations and signaling) equal to (iv_mv_pred_flag[layerId] && inter_layer_pred_enabled_flag). For each PU, video decoder 30 may check the value of ivMvPredPosFlag to determine whether the derivation process for the inter-view merge candidates and shifted disparity merging candidate are to be invoked. When ivMvPredPosFlag is equal to 0, video decoder 30 may not invoke the derivation process for the inter-view merge candidates and shifted disparity merging candidate. In one example, video encoder 20 may set a variable vspPosFlag (indicating whether VSP is possible for the current slice due to e.g., configurations and signaling) equal to (view_synthesis_pred_flag[layerId] && inter_layer_pred_enabled_flag). For each PU, video decoder 30 may check the value of vspPosFlagis to determine whether the derivation process for the view synthesis prediction merge candidate is to be invoked. When ivMvPredPosFlag is equal to 0, video decoder 30 may not invoke the derivation process for the view synthesis prediction merging candidate.

According to a second technique of this disclosure, new variables may be introduced at the slice-level to control the signaling of ic_flag for illumination compensation and iv_res_pred_weight_idx for advanced residual prediction at the block level. In other words, conditions can be introduced at the slice-level for the signaling of illumination compensation and advanced residual prediction at the block level. In one example, video encoder 20 may set a variable resPredPosFlag (indicating whether residual prediction is possible for the current slice due to e.g., configurations and signaling) equal to (iv_res_pred_flag[layerId] && inter_layer_pred_enabled_flag). Furthermore, when resPredPosFlag is equal to 0, video encoder 20 may skip the signaling of iv_res_pred_weight_idx and advanced residual prediction can be disabled for the current slice. By disabling advanced residual prediction, video decoder 30 may be able to skip invoking sub-clause I.8.5.3.3.7. In another example, video encoder 20 may set a variable icPosFlag (indicating whether illumination compensation is possible for the current slice due to e.g., configurations and signaling) equal to (slice_ic_enable_flag && inter_layer_pred_enabled_flag). Furthermore, when icPosFlag is equal to 0, video encoder 20 may skip signaling of ic_flag, and illumination compensation shall be disabled for current slice. By disabling illumination compensation, video decoder 30 may be able to skip invoking sub-clause I.8.5.3.3.6.

According to a third technique of this disclosure, video encoder 20 and/or video decoder 30 may avoid other decoding processes based on the above newly introduced variables or condition checks at the slice-level. In one example, video encoder 20 and video decoder 30 may skip the disparity vector derivation process for coding units of a slice when no advanced inter-view coding tools are available. If such a slice belongs to a texture picture, when none of ivMvPredPosFlag, vspPosFlag and resPredPosFla of the slice is equal to 1, video encoder 20 and video decoder 30 may skip the disparity vector derivation process (NBDV) for texture (as in sub-clause I.8.5.5). If such a slice belongs to a depth picture, when ivMvPredPosFlag in slice-level is equal to 0, video encoder 20 and video decoder 30 may skip the disparity vector derivation process for depth (as in sub-clause I.8.5.6).

According to a fourth technique of this disclosure, when no inter-view reference pictures are available for a current slice, video encoder 20 and/or video decoder 30 may not need to perform some slice-level derivation processes. For example, video encoder 20 and/or video decoder 30 may not invoke the derivation process for the candidate picture list for disparity vector derivation when the current slices includes no available inter-view reference pictures. Video encoder 20 and/or video decoder 30 may not invoke the derivation process for alternative target reference index for TMVP in merge mode when the current slice includes no inter-view reference pictures. Video encoder 20 and/or video decoder 30 may not invoke the derivation process for default reference view order index for disparity derivation the current slice includes no available inter-view reference pictures. Video encoder 20 and/or video decoder 30 may not invoke the derivation process for the target reference index for residual prediction when the current slice includes no available inter-view reference pictures.

According to a fifth technique of this disclosure, the syntax elements iv_mv_pred_flag[layerId], view_synthesis_pred_flag[layerId], depth_refinement_flag[layerId] and iv_res_pred_flag[layerId] may not be signaled when no direct reference layers are available, as indicated by NumDirectRefLayers[layerId], in VPS, for current layer with nuh_layer_id equal to layerId. Alternatively, the signaling of the above flags may be unchanged, but a constraint may be added that when a current layer with index equal to layerId includes no direct reference layers, video encoder 20 sets the values of the above flags to be equal to 0 (i.e. the coding tools are disabled).

In an example of video encoder 20 being configured to implement the fifth technique, video encoder 20 may determine that the current layer has no direct reference layers, and in response to determining that the current layer has no direct reference layers, set a first syntax element (e.g. iv_mv_pred_flag[layerId]) to a value that indicates that inter-view motion parameter prediction is not used to decode the current layer, set a second syntax element (e.g. view_synthesis_pred_flag[layerId]) to a value that indicates that view synthesis prediction merge candidates are not used for decoding the current layer, set a third syntax element (e.g. depth_refinement_flag[layerId]) to a value that indicates that accessing depth view components are not used in the derivation process for a disparity vector for the current layer; set a fourth syntax element (e.g. iv_res_pred_flag[layerId]) to a value that indicates that inter-view residual prediction is not used in the decoding process of the current layer. Video encoder 20 may generate an encoded bitstream of video data comprising the first syntax element, the second syntax element, the third syntax element, and the fourth syntax element.

In this example, the values of the first, second, third, and fourth syntax elements are all constrained (e.g. to zero) based on video encoder 20 determining that the current layer has no direct reference layers. Although this disclosure uses the value of zero for purposes of example, it should be understood that values other than zero may be used to achieve the same ends. Video encoder 20 may, for example, determine that the current layer has no direct reference layers by running multiple encoding passes and determining that the use of direct reference layers does not improve overall coding quality (e.g. the rate-distortion tradeoff).

In an example of video decoder 30 being configured to implement aspects of the fifth technique, video decoder 30 may, for example, for a current layer being decoded, determine that the current layer has no direct reference layers. In such instances, due to the constraint implemented by video encoder 20, video decoder 30 receives a first syntax element (e.g. iv_mv_pred_flag[layerId]) set to a value that indicates that inter-view motion parameter prediction is not used to decode the current layer, receives a second syntax element (e.g. view_synthesis_pred_flag[layerId]) set to a value that indicates that view synthesis prediction merge candidates are not used for decoding the current layer, receives a third syntax element (e.g. depth_refinement_flag[layerId]) set to a value that indicates that accessing depth view components are not used in the derivation process for a disparity vector for the current layer, and receives a fourth syntax element (e.g. iv_res_pred_flag[layerId]) set to a value that indicates that inter-view residual prediction is not used in the decoding process of the current layer. Video decoder 30 decodes the current layer without using inter-view motion parameter prediction, without using view synthesis prediction merge candidates, without using depth view components in the derivation process for a disparity vector, and without using inter-view residual prediction.

Details related to implementation will now be discussed. The newly added parts compared to 3D-HEVC working draft 3 are shown with double underline and the removed parts are marked with [[doublebrackets]] ~~strikethrough~~.

A first example implementation gives examples for simplifications of merge candidate list decoding processes when a current slice includes no inter-view reference pictures. This first example implementation provides an example for implementing the first technique of this disclosure introduced above.

I.8.3.10 Initialization of Variables
A variable ivMvPredFlag is set equal to (iv_mv_pred_flag[nuh_layer_id]&&inter_layer_pred_enabled_flag).
A variable vspPosFlag is set equal to (view_synthesis_pred_flag[nuh_layer_id]&&inter_layer_pred_enabled_flag).
A variable resPredPosFlag is set equal to (iv_res_pred_flag[nuh_layer_id]&&inter_layer_pred_enabled_flag).
A variable icPosFlag is set equal to (slice_ic_enable_flag&&inter_layer_pred_enabled_flag).

Alternatively, the following applies:
A variable ivMvPredFlag is set equal to (iv_mv_pred_flag[nuh_layer_id]&&NumActiveRefLayerPics>0).
A variable vspPosFlag is set equal to (view_synthesis_pred_flag[nuh_layer_id]&&NumActiveRefLayerPics>0).
A variable resPredPosFlag is set equal to (iv_res_pred_flag[nuh_layer_id]&&NumActiveRefLayerPics>0).
A variable icPosFlag is set equal to (slice_ic_enable_flag&&NumActiveRefLayerPics>0).

Alternatively, video encoder 20 and video decoder 30 may derive the availability of inter-view reference pictures by checking all the reference pictures in the reference picture lists. Denote the availability flag by bAvailIvRef. When the reference picture list includes at least one inter-view reference picture, video encoder 20 may set the variable bAvailIvRef to 1. Otherwise, video encoder 20 may set the variable bAvailIvRef to 0. In this case, the following further applies:

A variable ivMvPredFlag is set equal to (iv_mv_pred_flag[nuh_layer_id] && bAvailIvRef).
A variable vspPosFlag is set equal to (view_synthesis_pred_flag[nuh_layer_id] && bAvailIvRef).
A variable resPredPosFlag is set equal to (iv_res_pred_flag[nuh_layer_id] && bAvailIvRef).
A variable icPosFlag is set equal to (slice_ic_enable_flag && bAvailIvRef).

Alternatively, the availability of inter-view reference pictures is derived to be 0 when no entry in reference picture list 0 is an inter-view reference picture and 1, otherwise. Alternatively, the availability of inter-view reference pictures is derived to be 0 when no entry in reference picture list 1 is an inter-view reference picture and 1, otherwise.

Alternatively, the availability of inter-view reference pictures is derived to be 0 when no entry in reference picture list 0 or reference picture list 1 is an inter-view reference picture and 1, otherwise.

I.8.5.3.2.1 Derivation Process for Luma Motion Vectors for Merge Mode

This process is only invoked when merge_flag[xPb][yPb] is equal to 1, where (xPb, yPb) specify the top-left sample of the current luma prediction block relative to the top-left luma sample of the current picture.

Inputs to this process are:
. . .

Outputs of this process are:
. . .

. . .

The motion vectors mvL0 and mvL1, the reference indices refIdxL0 and refIdxL1, and the prediction utilization flags predFlagL0 and predFlagL1 are derived by the following ordered steps:
 1. The derivation process for the base merge candidate list as specified in subclause H.8.5.3.2.18 is invoked with the luma location (xCb, yCb), the luma location (xPb, yPb), the variables nCbS, nPbW, nPbH, and the partition index partIdx as inputs, and the output being a modified luma location (xPb, yPb), the modified variables nPbW and nPbH, the modified variable partIdx, the luma location (xOrigP, yOrigP), the variables nOrigPbW and nOrigPbH, the merge candidate list baseMergeCandList, the luma motion vectors mvL0N and mvL1N, the reference indices refIdxL0N and refIdxL1N, and the prediction list utilization flags predFlagL0N and predFlagL1N, with N being replaced by all elements of baseMergeCandList.

For N being replaced by $A_1$, $B_1$, $B_0$, $A_0$ and $B_2$, the following applies:
 If N is an element in baseMergeCandList, availableFlagN is set equal to 1.
 Otherwise (N is not an element in baseMergeCandList), availableFlagN is set equal to 0.

Depending on ivMvPredPosFlag[[iv_mv_pred_ flag [nuh_layer_id] and DispAvailabilityIdc[xPb][yPb]]], the following applies:
  If ivMvPredPosFlag[[iv_mv_pred_flag[nuh_layer_id] is equal to 0 or DispAvailabilityIdc[xPb][yPb] is equal to DISP_NONE]], the flags availableFlagIvMC, availableIvMCShift and availableFlagIvDC are set equal to 0.
  Otherwise (ivMvPredPosFlag[[iv_mv_pred_flag[nuh_layer_id] is equal to 1 and inter_layer_pred_enabled_flag]]), the derivation process for the inter-view merge candidates as specified in subclause H.8.5.3.2.10 is invoked with the luma location (xPb, yPb), the variables nPbW and nPbH, as the inputs and the output is assigned to the availability flags availableFlagIvMC, availableIvMCShift and availableFlagIvDC, the reference indices refIdxLXIvMC, refIdxLXIvMCShift and refIdxLXIvDC, the prediction list utilization flags predFlagLXIvMC, predFlagLXivMCShift and predFlagLXIvDC, and the motion vectors mvLXIvMC, mvLXIvMCShift and mvLXIvDC (with X being 0 or 1, respectively).
Depending on vspPosFlag[[view_synthesis_pred_ flag [nuh_layer_id] and DispAvailabilityIdc[xPb][yPb]]], the following applies:
  If vspPosFlag[[view_synthesis_pred_flag[nuh_ layer_id]]] is equal to 0 [[or DispAvailabilityIdc[xPb][yPb] is equal to DISP_NONE]], the flag availableFlagVSP is set equal to 0.
  Otherwise (vspPosFlag[[view_synthesis_pred_flag[nuh_layer_id]]] is equal to 1), the derivation process for a view synthesis prediction merge candidate as specified in subclause H.8.5.3.2.13 is invoked with the luma locations (xCb, yCb) as input and the outputs are the availability flag availableFlagVSP, the reference indices refIdxL0VSP and refIdxL1VSP, the prediction list utilization flags predFlagL0VSP and predFlagL1VSP, and the motion vectors mvL0VSP and mvL1VSP.
Depending on mpi_flag[nuh_layer_id], the following applies:
. . .
The merging candidate list, extMergeCandList, is constructed as follows:
. . .
WhenivMvPredPosFlagisequalto1,the variable availableFlagIvDCShift is set equal to 0, and when availableFlagIvMCShift is equal to 0, and i is less than (5+NumExtraMergeCand), the derivation process for the shifted disparity merging candidate as specified in subclause H.8.5.3.2.15 is invoked with the luma location (xPb, yPb), the variables nPbW and nPbH, and the availability flags availableFlagN, the reference indices refIdxL0N and refIdxL1N, the prediction list utilization flags predFlagL0N and predFlagL1N, the motion vectors mvL0N and mvL1N, of every candidate N being in extMergeCandList, extMergeCandList, and i as the inputs and the outputs are the flag availableFlagIvDCShift, the prediction utilization flags predFlagL0IvDCShift and predFlagL1IvDCShift, the reference indices refIdxL0IvDCShift and refIdxL1IvDCShift, and the motion vectors mvL0IvDCShift and mvL1IvDCShift.
Alternatively, furthermore, when ivMvPredPosFlag is equal to 0, NumExtraMergeCand for current texture view is set to 0. The corresponding specification change is listed below:
I.7.4.7.1 General Slice Segment Header Semantics
The specifications in subclause G.7.4.7.1 apply with the following modifications and additions.

The variable DepthFlag is set equal to VpsDepthFlag [nuh_layer_id] and the variable ViewIdx is set equal to ViewOrderIdx[nuh_layer_id].
five_minus_max_num_merge_cand specifies the maximum number of merging MVP candidates supported in the slice subtracted from 5.
The variable NumExtraMergeCand is derived as specified in the following:

$$\text{NumExtraMergeCand}=[[iv\_mv\_pred\_\text{flag}[nuh\_\text{layer\_id}]]] \quad \underline{ivMvPredPosFlag}||mpi\_\text{flag}[nuh\_\text{layer\_id}] \quad (I\text{-}14)$$

. . .
A second example implementation, which provides an example of how to implement the second technique of this disclosure introduced above, will now be discussed.
The definitions of ResPredPosFlag and icPosFlag are the same as those used in section 6.1
I.7.4.9.5.2 Coding Unit Extension Semantics
The variable rpEnableFlag is derived as specified in the following:
  rpEnableFlag=[[iv_res_pred_flag[nuh_layer_id]]]
    resPredPosFlag && RpRefPicAvailFlag $$(\text{CuPredMode}[x0][y0]!=\text{MODE\_INTRA})\&\& \quad (\text{PartMode}==\text{PART\_2N}\times 2N) \quad (I\text{-}32)$$

iv_res_pred_weight_idx specifies the index of the weighting factor used for residual prediction. iv_res_pred_weight_idx equal to 0 specifies that residual prediction is not used for the current coding unit. iv_res_pred_weight_idx not equal to 0 specifies that residual prediction is used for the current coding unit. When not present, the value of iv_res_pred_weight_idx is inferred to be equal to 0.
The variable icEnableFlag is set equal to 0 and when icPosFlag [[slice_ic_enable_flag]] is equal to 1 and PartMode is equal to 2N×2N and CuPredMode[x0][y0] is not equal to MODE_INTRA, the following applies:
  If merge_flag[x0][y0] is equal to 1, the following applies:

$$G.1.1.1 \; ic\text{EnableFlag}=(\text{merge\_}idx[x0][y0]!=0)||!\text{slice\_} ic\_\text{disable\_merge\_zero\_}idx\_\text{flag} \quad (I\text{-}33))$$

Otherwise (merge_flag[x0][y0] is equal to 0), the following applies:
    With X being replaced by 0 and 1, the variable refViewIdxLX is set equal to ViewIdx(RefPicListLX [ref_idx_1X[x0][y0]]).
  The flag icEnableFlag is derived as specified in the following:

$$ic\text{EnableFlag}=(\text{inter\_}pred\_idc[x0][y0]!=Pred\_L0\&\& \text{ref}View{IdxL1}!=View{Idx})||(\text{inter\_}pred\_idc[x0] [y0]!=Pred\_L1\&\& \text{ref}View{IdxL0}!=View{Idx}) \quad (I\text{-}34)$$

ic_flag equal to 1 specifies illumination compensation is used for the current coding unit. ic_flag equal to 0 specifies illumination compensation is not used for the current coding unit. When not present, ic_flag is inferred to be equal to 0.
When DispAvailabilityIdc[x0][y0] is not equal to DISP_AVAILABLE, iv_res_pred_weight_idx shall be equal to 0.
A third example implementation, which gives an example of how to implement the third technique of this disclosure introduced above will now be discussed.
The definitions of ivMvPredPosFlag, vspPosFlag, resPredPosFlag and icPosFlag are the same as those used in section 6.1.

I.8.5.1 General Decoding Process for Coding Units Coded in Inter Prediction Mode
Inputs to this process are:
   a luma location (xCb, yCb) specifying the top-left sample of the current luma coding block relative to the top-left luma sample of the current picture,
   a variable log 2CbSize specifying the size of the current coding block.
Output of this process is a modified reconstructed picture before deblocking filtering. The derivation process for quantization parameters as specified in subclause 8.6.1 is invoked with the luma location (xCb, yCb) as input.
The variable $nCbS_L$ is set equal to 1<<log 2CbSize and the variable $nCbS_C$ is set equal to 1<<(log 2CbSize−1).
The decoding process for coding units coded in inter prediction mode consists of following ordered steps:
   2. When [[iv_mv_pred_flag[nuh_layer_id]]] ivMvPredPosFlag is equal to 1, or resPredPosFlag [[iv_res_pred_flag[nuh_layer_id]]] is equal to 1 or vspPosFlag [[view_synthesis_pred_flag[nuh_layer_id]]] is equal to 1, following applies:
      If DepthFlag is equal to 0 the derivation process for disparity vectors as specified in subclause I.8.5.5 is invoked with the luma locations (xCb, yCb), the coding block size $nCbS_L$ as the inputs.
      Otherwise (DepthFlag is equal to 1), the derivation process for disparity vectors from neighouring depth samples as specified in subclause I.8.5.6 is invoked with the luma locations (xCb, yCb), the coding block size $nCbS_L$ as the inputs.
   The inter prediction process as specified in subclause H.8.5.3 is invoked with the luma location (xCb, yCb) and the luma coding block size log 2CbSize as inputs, and the outputs are three arrays $predSamples_L$, $predSamples_{Cb}$, and $predSamples_{Cr}$.
   . . .

A fourth example implementation shows examples for simplifications of slice-level decoding processes when a current slice includes no inter-view reference pictures. The fourth example implementation provides an example of how to implement the fourth technique of this disclosure introduced above.

An example of how to implement techniques of this disclosure is as follows.
I.8.3.5 Derivation Process for the Candidate Picture List for Disparity Vector Derivation
Thisprocessisinvokedwhenthecurrentsliceisa PorB slice andinter_layer_pred_enabled_flagisequalto1.
The variable NumDdvCandPics is set equal to 0 and the candidate picture list DdvCandPicList with a number of NumDdvCandPics elements is constructed as follows:
When slice_temporal_mvp_enabled_flag is equal to 1 the following ordered steps apply:
   1. DdvCandPicList[0] is set equal to RefPicListX[collocated_ref_idx], with X equal to (1−collocated_from_10_flag), and NumDdvCandPics is set equal to 1.
   2. The variable lowestTemporalIdRefs is set equal to 7.
   3. NumDdvCandPics, DdvCandPicList[1] and lowestTemporalIdRefs are derived as specified in the following:

```
for ( dir = 0; dir < 2 ; dir++) {
    X = dir ? collocated_from_l0_flag : (1 −
    collocated_from_l0_flag)
```

```
    for( i = 0; i <= num_ref_idx_lX_default_active_minus1;
    i++ ) {
        if( ViewIdx == ViewIdx( RefPicListX[ i ] )
            && ( X == collocated_from_l0_flag || i !=
collocated_ref_idx )
            && ( NumDdvCandPics != 2 ) ) {
            if( RefPicListX[ i ] is a random access view component ) {
                DdvCandPicsList[ 1 ] = RefPicListX[ i ]
                NumDdvCandPics = 2
            }
            else if( lowestTemporalIdRefs > TemporalId of
            RefPicListX[ i ] )
                lowestTemporalIdRefs = TemporalId of RefPicListX[ i ]
        }
    }
}
```

I.8.3.7 Derivation Process for the Alternative Target Reference Index for TMVP in Merge Mode
This process is invoked when the current slice is a P or B slice andinter_layer_pred_enabled_flagisequalto1.
The variables AltRefIdxL0 and AltRefIdxL1 are set equal to −1 and the following applies for X in the range of 0 to 1, inclusive:
   When X is equal to 0 or the current slice is a B slice the following applies: zeroIdxLtFlag=RefPicListX[0] is a short-term reference picture ? 0:1
      for (i=1; i<=num_ref_idx_1X_active_minus1 && AltRefIdxLX==−1; i++)
         if ((zeroIdxLtFlag && RefPicListX[i] is a short-term reference picture)||(!zeroIdxLtFlag && RefPicListX[i] is a long-term reference picture))
            AltRefIdxLX=i
I.8.3.8 Derivation Process for the Default Reference View Order Index for Disparity Derivation
This process is invoked when the current slice is a P or B slice andinter_layer_pred_enabled_flagisequalto1.
The variable DefaultRefViewIdx is set equal to −1, the variable DefaultRefViewIdxAvailableFlag is set equal to 0, and the following applies for curViewIdx in the range of 0 to (ViewIdx−1), inclusive:
   The following applies for X in the range of 0 to 1, inclusive:
      When X is equal to 0 or the current slice is a B slice, the following applies for i in the range of 0 to NumRefPicsLX, inclusive:
         When all of the following conditions are true, DefaultRefViewIdx is set equal to curViewIdx and DefaultRefViewIdxAvailableFlag is set equal to 1.
         DefaultRefViewIdxAvailableFlag is equal to 0.
         ViewIdx(RefPicListX[i]) is equal to curViewIdx.
         PicOrderCnt(RefPicListX[i]) is equal to PicOrderCntVal.
I.8.3.9 Derivation Process for the Target Reference Index for Residual Prediction
This process is invoked when the current slice is a P or B slice andinter_layer_pred_enabled_flagisequalto1.
The variables RpRefIdxL0 and RpRefIdxL1 are set equal to −1, the variables RpRefPicAvailFlagL0 and RpRefPicAvailFlagL1 are set equal to 0.
The following applies for X in the range of 0 to 1, inclusive:
   When X is equal to 0 or the current slice is a B slice the following applies:
      The variable pocDiff is set equal to $2^{15}-1$.
      For i in the range of 0 to num_ref_idx_1X_active_minus1, inclusive, the following applies:

The variable currPocDiff is set equal to Abs(PicOrderCnt(RefPicListX[i])-PicOrderCntVal).

When currPocDiff is not equal to 0 and currPocDiff is less than pocDiff, the following applies:

$$pocDiff=currPocDiff \quad (1\text{-}42)$$

$$RpRefIdxLX=i \quad (1\text{-}43)$$

$$RpRefPicAvailFlagLX=1 \quad (1\text{-}44)$$

. . .

Alternatively, the above condition of 'inter_layer_pred_enabled_flag is equal to 1' may be replaced by 'bAvailIvRef' derived in section 6.1.

An alternative implementation is as follows. When combined with the first example implementation described above, the following may apply without changing the above sub-clauses.

I.8.1.1 Decoding Process for a Coded Picture with Nuh_Layer_Id Greater than 0

The decoding process operates as follows for the current picture CurrPic:

3. The decoding of NAL units is specified in subclause G.8.2.
4. The processes in subclause G.8.1.2 and G.8.3.4 specify the following decoding processes using syntax elements in the slice segment layer and above:
   Prior to decoding the first slice of the current picture, subclause G.8.1.2 is invoked.
   At the beginning of the decoding process for each P or B slice, the decoding process for reference picture lists construction specified in subclause G.8.3.4 is invoked for derivation of reference picture list 0 (RefPicList0), and when decoding a B slice, reference picture list 1 (RefPicList1).
   When [[iv_mv_pred_flag[nuh_layer_id] ivMvPredPosFlag is equal to 1 or iv_res_pred_flag[nuh_layer_id]]] resPredPosFlag is equal to 1 or vspPosFlag is equal to 1, the decoding process for candidate picture list for disparity vector derivation in subclause I.8.3.5 is invoked at the beginning of the decoding process for each P or B slice.
   At the beginning of the decoding process for each P or B slice, andinter_layer_pred_enabled_flagisequalto1, the derivation process for the alternative target reference index for TMVP in merge mode as specified in subclause I.8.3.7 is invoked.
   At the beginning of the decoding process for each P or B slice, andinter_layer_pred_enabled_flagisequalto1, the derivation process for the default reference view order index for disparity derivation as specified in subclause I.8.3.8 is invoked.
   When iv_res_pred_flag[layerId] is equal to 1, andinter_layer_pred_enabled_flagisequalto1, the derivation process for the for the target reference index for residual prediction as specified in subclause I.8.3.9 is invoked, at the beginning of the decoding process for each P or B slice.
   When DltFlag[nuh_layer_id] is equal to 1, the decoding process for the depth lookup table in subclause I.8.3.6 is invoked at the beginning of the decoding process of first slice.

Alternatively, the above condition of 'inter_layer_pred_enabled_flag is equal to 1' may be replaced by 'bAvailIvRef' derived in section 6.1.

A fifth example implementation, which provides an example of how to implement the fifth technique of this disclosure described above will now be described. This example implementation gives examples for removing unnecessary signaling of flags in VPS (or SPS).

Another alternative implementation is as follows. In this alternative, the presence of certain flags in the VPS depends on whether a current layer includes a dependent layer.

I.7.3.2.1.2 Video Parameter Set Extension 2 Syntax

| | Descriptor |
|---|---|
| vps_extension2( ) { | |
|   while( !byte_aligned( ) ) | |
|     vps_extension_byte_alignment_reserved_one_bit | u(1) |
|   for( i = 0; i <= vps_max_layers_minus1; i++ ) { | |
|     layerId = layer_id_in_nuh[ i ] | |
|     if ( layerId != 0) { | |
|       if( NumDirectRefLayers[layerId ]) { | |
|         iv_mv_pred_flag[ layerId ] | u(1) |
|         log2_sub_pb_size_minus3[ layerId ] | ue(v) |
|       } | |
|       if ( !VpsDepthFlag[ layerId ] ) { | |
|         if( NumDirectRefLayers[layerId ]) { | |
|           iv_res_pred_flag[ layerId ] | u(1) |
|           depth_refinement_flag[ layerId ] | u(1) |
|           view_synthesis_pred_flag[ layerId ] | u(1) |
|         } | |
|         depth_based_blk_part_flag[ layerId ] | |
|       } else { | |
|         mpi_flag[ layerId ] | u(1) |
|         vps_depth_modes_flag[ layerId ] | u(1) |
|         lim_qt_pred_flag[ layerId ] | u(1) |
|         vps_inter_sdc_flag[ layerId ] | u(1) |
|       } | |
|     } | |
|   } | |
| ... | |
| } | |

Note that in this alternative, the semantics of the flags in VPS (maybe later put in SPS) is not changed.

Another alternative implementation is as follows. A second alternative will now be described. In this alternative, the presence of certain flags in the VPS may not depend on whether a current layer includes a dependent layer, but instead, such a value must be 0 when the current layer includes no direct dependent layer. The syntax table in 3D-HEVC is kept unchanged. However, the semantics are modified which are shown in doubleunderline.

H.7.4.3.1.2 Video Parameter Set Extension 2 Semantics iv_mv_pred_flag[layerId] indicates whether inter-view motion parameter prediction is used in the decoding process of the layer with nuh_layer_id equal to layerId. iv_mv_pred_flag[layerId] equal to 0 specifies that inter-view motion parameter prediction is not used for the layer with nuh_layer_id equal to layerId. iv_mv_pred_flag[layerId] equal to 1 specifies that inter-view motion parameter prediction may be used for the layer with nuh_layer_id equal to layerId. When not present, the value of iv_mv_pred_flag[layerId] is inferred to be equal to 0. WhenNumDirectRefLayers[layerId]isequalto0,thevalueofiv_mv_pred_flag[layerId]shallbeequalto0.

log 2_sub_pb_size_minus2[layerId] specifies the value of the variable SubPbSize[layerId] that is used in the decoding of prediction units using the inter-view merge candidate. The value of log 2_sub_pb_size_minus2 shall be in the range of 0 to 4, inclusive.

The variable SubPbSize[layerId] is derived as specified in the following:

SubPbSize[layerId]=VpsDepthFlag(layerId)?64:1<<
(log 2_sub_pb_size_minus2[layerId]+2)       (H-6))

iv_res_pred_flag[layerId] indicates whether inter-view residual prediction is used in the decoding process of the layer with nuh_layer_id equal to layerId. iv_res_pred_flag [layerId] equal to 0 specifies that inter-view residual prediction is not used for the layer with nuh_layer_id equal to layerId. iv_res_pred_flag[layerId] equal to 1 specifies that inter-view residual prediction may be used for the layer with nuh_layer_id equal to layerId. When not present, the value of iv_res_pred_flag[layerId] is to be equal to 0. WhenNumDirectRefLayers[layerId]isequalto0,thevalueofiv_res_pred_flag[layerId]shallbeequalto0.

view_synthesis_pred_flag[layerId] equal to 0 specifies that view synthesis prediction merge candidates are not used for the layer with nuh_layer_id equal to layerId. view_synthesis_pred_flag[layerId] equal to 1 specifies that view synthesis prediction merge candidates might be used for the layer with nuh_layer_id equal to layerId. When not present, the value of view_synthesis_pred_flag[layerId] is inferred to be equal to 0. NumDirectRefLayers[layerId]isequalto0,thevalueofview_synthesis_pred_flag[layerId]shallbeequalto0.

Figure 12:
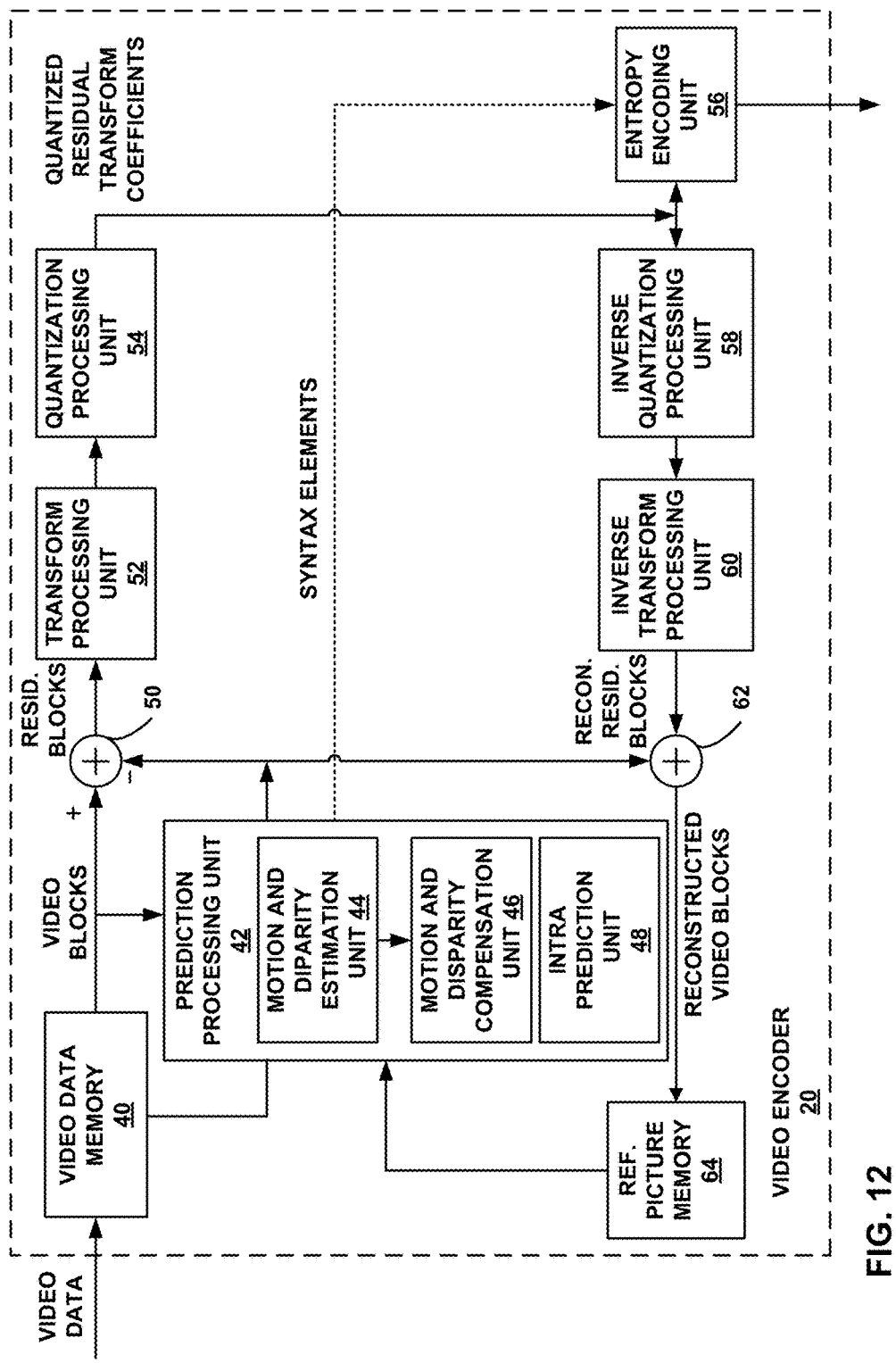
FIG. 12 shows an example of a video encoder configured to implement techniques described in this disclosure.

FIG. 12 is a block diagram illustrating an example of a video encoder that may implement the techniques described in this disclosure. For example, FIG. 12 illustrates video encoder 20 which may represent either a 3D-AVC compliant or a 3D-HEVC compliant video encoder. Video encoder 20 will be described using certain HEVC terminology such as PUs, TUs, and CUs, but it should be understood that the techniques described with reference to video encoder 20 are not necessarily limited to any one coding standard. Video encoder 20 of FIG. 12 should be recolonized as one specific example of video encoder 20 (shown in FIG. 1), although video encoder 20 may also be used in a different device or system. For example, the techniques of this disclosure may be applied by other video encoders that include more elements, fewer elements, or different elements than the example of FIG. 12.

Video encoder 20 may perform intra- and inter-coding of video blocks within video slices. For example, video encoder 20 may perform inter-prediction encoding or intra-prediction encoding. Intra-coding relies on spatial prediction to reduce or remove spatial redundancy in video within a given video frame or picture. Inter-coding relies on temporal prediction or inter-view prediction to reduce or remove temporal redundancy within adjacent frames or pictures of a video sequence or redundancy between pictures in different views. Intra-mode (I mode) may refer to any of several spatial based compression modes. Inter-modes, such as uni-directional prediction (P mode) or bi-prediction (B mode), may refer to any of several temporal-based compression modes.

In the example of FIG. 12, video encoder 20 includes video data memory 40, prediction processing unit 42, reference picture memory 64, summer 50, transform processing unit 52, quantization processing unit 54, and entropy encoding unit 56. Prediction processing unit 42 includes motion and disparity estimation unit 44, motion and disparity compensation unit 46, and intra prediction processing unit 48. For video block reconstruction, video encoder 20 also includes inverse quantization processing unit 58, inverse transform processing unit 60, and summer 62. A deblocking filter (not shown in FIG. 12) may also be included to filter block boundaries to remove blockiness artifacts from reconstructed video. If desired, the deblocking filter would typically filter the output of summer 62. Additional loop filters (in loop or post loop) may also be used in addition to the deblocking filter.

Video data memory 40 may store video data to be encoded by the components of video encoder 20. The video data stored in video data memory 40 may be obtained, for example, from video source 18. Reference picture memory 64 is one example of a decoding picture buffer (DPB that stores reference video data for use in encoding video data by video encoder 20 (e.g., in intra- or inter-coding modes, also referred to as intra- or inter-prediction coding modes). Video data memory 40 and reference picture memory 64 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 40 and reference picture memory 64 may be provided by the same memory device or separate memory devices. In various examples, video data memory 40 may be on-chip with other components of video encoder 20, or off-chip relative to those components.

Video encoder 20 receives video data, and a partitioning unit (not shown) partitions the data into video blocks. This partitioning may also include partitioning into slices, tiles, or other larger units, as wells as video block partitioning (e.g., macroblock partitions and sub-blocks of partitions). Video encoder 20 generally illustrates the components that encode video blocks within a video slice to be encoded. The slice may be divided into multiple video blocks (and possibly into sets of video blocks referred to as tiles). Prediction processing unit 42 may select one of a plurality of possible coding modes, such as one of a plurality of intra coding modes (intra-prediction coding modes) or one of a plurality of inter coding modes (inter-prediction coding modes), for the current video block based on error results (e.g., coding rate and the level of distortion). Prediction processing unit 42 may provide the resulting intra- or inter-coded block to summer 50 to generate residual block data and to summer 62 to reconstruct the encoded block for use as a reference picture.

Intra prediction processing unit 48 within prediction processing unit 42 may perform intra-predictive coding of the current video block relative to one or more neighboring blocks in the same frame or slice as the current block to be coded to provide spatial compression. Motion and disparity estimation unit 44 and motion and disparity compensation unit 46 within prediction processing unit 42 perform inter-predictive coding of the current video block relative to one or more predictive blocks in one or more reference pictures to provide temporal compression.

Motion and disparity estimation unit 44 may be configured to determine the inter-prediction mode for a video slice according to a predetermined pattern for a video sequence. The predetermined pattern may designate video slices in the sequence as P slices or B slices. Motion and disparity estimation unit 44 and motion and disparity compensation unit 46 may be highly integrated, but are illustrated separately for conceptual purposes. Motion estimation, performed by motion and disparity estimation unit 44, is the process of generating motion vectors, which estimate motion for video blocks. A motion vector, for example, may indicate the displacement of a video block within a current video frame or picture relative to a predictive block within a reference picture.

A predictive block is a block that is found to closely match the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion and disparity estimation unit 44 may perform a motion search relative to the full pixel positions and fractional pixel positions and output a motion vector with fractional pixel precision.

Motion and disparity estimation unit 44 calculates a motion vector for a video block in an inter-coded (inter-prediction coded) slice by comparing the position of the video block to the position of a predictive block of a reference picture. The reference picture may be selected from a first reference picture list (RefPicList0) or a second reference picture list (RefPicList1), each of which identify one or more reference pictures stored in reference picture memory 64. Motion and disparity estimation unit 44 sends the calculated motion vector to entropy encoding unit 56 and motion and disparity compensation unit 46.

Motion compensation, performed by motion and disparity compensation unit 46, may involve fetching or generating the predictive block based on the motion vector determined by motion estimation, possibly performing interpolations to sub-pixel precision. Upon receiving the motion vector for the current video block, motion and disparity compensation unit 46 may locate the predictive block to which the motion vector points in one of the reference picture lists. Video encoder 20 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion and disparity compensation unit 46 may also generate syntax elements associated with the video blocks and the video slice for use by video decoder 30 in decoding the video blocks of the video slice.

Intra prediction processing unit 48 may intra-predict a current block, as an alternative to the inter-prediction performed by motion and disparity estimation unit 44 and motion and disparity compensation unit 46, as described above. In particular, intra prediction processing unit 48 may determine an intra-prediction mode to use to encode a current block. In some examples, intra prediction processing unit 48 may encode a current block using various intra-prediction modes, e.g., during separate encoding passes, and intra-prediction processing unit 48 (or a mode select unit, in some examples) may select an appropriate intra-prediction mode to use from the tested modes. For example, intra-prediction processing unit 48 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra prediction processing unit 48 may calculate ratios from the distortions and rates for the various encoded blocks to determine which intra-prediction mode exhibits the best rate-distortion value for the block.

In any case, after selecting an intra-prediction mode for a block, intra prediction processing unit 48 may provide information indicative of the selected intra-prediction mode for the block to entropy encoding unit 56. Entropy encoding unit 56 may encode the information indicating the selected intra-prediction mode in accordance with the techniques of this disclosure. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

After prediction processing unit 42 generates the predictive block for the current video block via either inter-prediction or intra-prediction, video encoder 20 forms a residual video block by subtracting the predictive block from the current video block. The residual video data in the residual block may be applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization processing unit 54. Quantization processing unit 54 quantizes the transform coefficients to further reduce bit rate. The quantization process may reduce the bit depth associated with some or all of the coefficients. The degree of quantization may be modified by adjusting a quantization parameter. In some examples, quantization processing unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Following the entropy encoding by entropy encoding unit 56, the encoded bitstream may be transmitted to video decoder 30, or archived for later transmission or retrieval by video decoder 30. Entropy encoding unit 56 may also entropy encode the motion vectors and the other syntax elements for the current video slice being coded.

Inverse quantization processing unit 58 and inverse transform processing unit 60 apply inverse quantization and inverse transformation, respectively, to reconstruct the residual block in the pixel domain for later use as a reference block of a reference picture. Motion and disparity compensation unit 46 may calculate a reference block by adding the residual block to a predictive block of one of the reference pictures within one of the reference picture lists. Motion and disparity compensation unit 46 may also apply one or more interpolation filters to the reconstructed residual block to calculate sub-integer pixel values for use in motion estimation. Summer 62 adds the reconstructed residual block to the motion compensated prediction block produced by motion and disparity compensation unit 46 to produce a reference block for storage in reference picture memory 64. The reference block may be used by motion and disparity estimation unit 44 and motion and disparity compensation unit 46 as a reference block to inter-predict a block in a subsequent video frame or picture.

In this manner, video encoder 20 is an example of a video encoder that may be configured to implement one or more example techniques described in this disclosure. For example, video data memory 40 stores video data. The video data may include a texture video component of a dependent view and a depth view component that corresponds to the texture view component, each of which video encoder 20 is to encode in a 3D-AVC compliant or 3D-HEVC compliant video coding process.

In the techniques described in this disclosure, video encoder 20 may include one or more processors that are configured to encode, in a 3D-AVC compliant or 3D-HEVC compliant video coding process, a texture view component of a dependent view of the video data. As described above, each view in a 3D-AVC includes a texture view component and depth view component. 3D-AVC video includes one base view and one or more enhancement, or dependent views, where texture view components of the one or more enhancement, or dependent views, may be inter-view predicted.

To encode the texture view component, video encoder 20 may be configured to evaluate motion information of one or more neighboring blocks of a current block in the texture view component to determine whether at least one neighboring block is inter-view predicted with a disparity motion vector that refers to an inter-view reference picture in a view other than the dependent view. Video encoder 20 may derive a disparity vector for the current block based on the disparity motion vector for one of the neighboring blocks. For texture-first coding, video encoder 20 may encode a depth view component, of the video data, that corresponds to the texture view component subsequent to encoding the texture view component.

Prediction processing unit 42 may be configure to, for a current layer being encoded, determine that the current layer has no direct reference layers. Based on determining that the current layer has no direct reference layers, prediction processing unit 42 may set at least one of a first syntax element, a second syntax element, a third syntax element, or a fourth syntax element to a value indicating a disabling value. A disabling value for the first syntax element (e.g. iv_mv_pred_flag[layerId]) may, for example, indicate that inter-view motion parameter prediction is disabled for (e.g. not used to decode) the current layer. A disabling value for the second syntax element (e.g. view_synthesis_pred_flag[layerId]) may, for example, indicate that view synthesis prediction merge candidates are disabled for (e.g. not used to decode) the current layer. A disabling value for the third syntax element (e.g. depth_refinement_flag[layerId]) may, for example, indicate that depth view components are disabled for (e.g. not used as part of) the derivation process for a disparity vector for the current layer. A disabling value the fourth syntax element (e.g. iv_res_pred_flag[layerId]) may, for example, indicate that inter-view residual prediction is disabled for (e.g. not used to decode) the current layer. Entropy encoding unit 56 may entropy encode the first, second, third, and fourth syntax elements to generate an encoded bitstream of video data comprising the first syntax element, the second syntax element, the third syntax element, and the fourth syntax element.

Given the constraint described above, video encoder 20 may be configured, as part of testing encoding hypotheses to determine how to encode a particular sequence of video data, to only test encoding hypotheses where one or more of the first, second, third, and fourth syntax elements are set to disabling values when video encoder 20 encodes a current layer without direct reference layers.

In some examples, prediction processing unit 42 of video encoder 20 may be one example of a general-purpose or special-purpose processor, or may be operable by a general-purpose or special-purpose processor. Prediction processing unit 42 may be configured to implement the examples described in this disclosure. In some examples, a unit (e.g., one or more processors) other than prediction processing unit 42 may implement the examples described above. In some examples, prediction processing unit 42 in conjunction with one or more other units of video encoder 20 may implement the examples described above. In some examples, a processor of video encoder 20 (not shown in FIG. 12) may, alone or in conjunction with other processors of video encoder 20, implement the examples described above.

Figure 13:
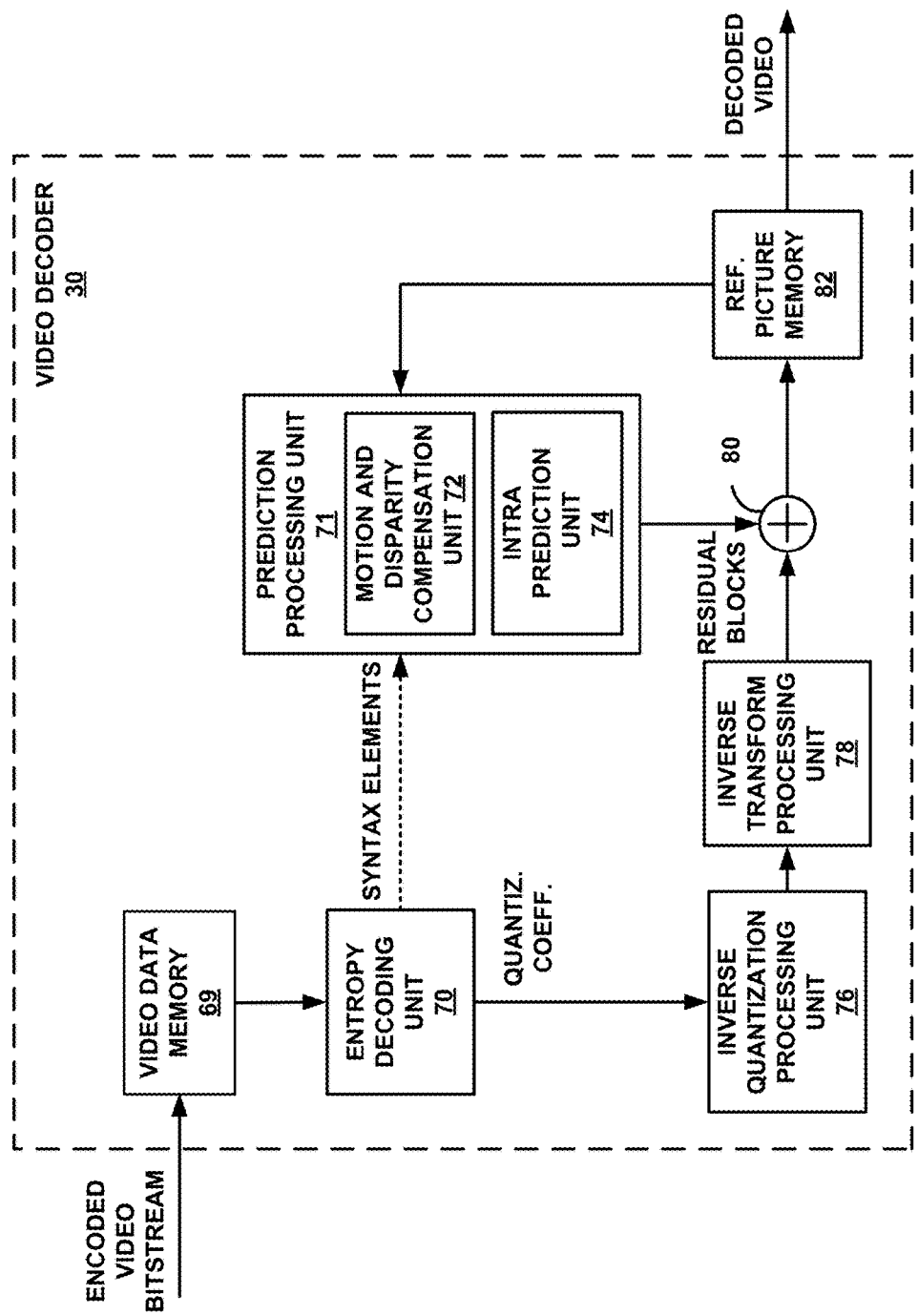
FIG. 13 shows an example of a video decoder configured to implement techniques described in this disclosure.

FIG. 13 is a block diagram illustrating an example of a video decoder that may implement the techniques described in this disclosure. FIG. 13 is a block diagram illustrating an example of a video decoder that may implement the techniques described in this disclosure. For example, FIG. 13 illustrates video decoder 30 which may represent either a 3D-AVC compliant or a 3D-HEVC compliant video decoder. Video decoder 30 will be described using certain HEVC terminology such as PUs, TUs, and CUs, but it should be understood that the techniques described with reference to video decoder 30 may also be performed with video coded according to the H.264 standard. Video decoder 30 of FIG. 13 should be recolonized as one specific example of video decoder 30 (shown in FIG. 1). Moreover, the techniques of this disclosure may be applied by other video decoders that include more elements, fewer elements, or different elements than the example of FIG. 13.

Video decoder 30 may perform inter-prediction decoding or intra-prediction decoding. FIG. 12 illustrates video decoder 30, which may correspond to video decoder 30 of FIG. 1 or may be a decoder used in a different device or system. In the example of FIG. 13, video decoder 30 includes video data memory 69, entropy decoding unit 70, prediction processing unit 71, inverse quantization processing unit 76, inverse transform processing unit 78, summer 80, and reference picture memory 82. Prediction processing unit 71 includes motion and disparity compensation unit 72 and intra prediction processing unit 74. Video decoder 30 may, in some examples, perform a decoding pass generally reciprocal to the encoding pass described with respect to video encoder 20 from FIG. 13.

Video data memory 69 may store video data, such as an encoded video bitstream, to be decoded by the components of video decoder 30. The video data stored in video data memory 69 may be obtained, for example, from storage device 34, from a local video source, such as a camera, via wired or wireless network communication of video data, or by accessing physical data storage media. Video data memory 69 may form a coded picture buffer (CPB) that stores encoded video data from an encoded video bitstream.

Reference picture memory 82 is one example of a decoded picture buffer (DPB) that stores reference video data for use in decoding video data by video decoder 30 (e.g., in intra- or inter-coding modes). Video data memory 69 and reference picture memory 82 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 69 and reference picture memory 82 may be provided by the same memory device or separate memory devices. In various examples, video data memory 69 may be on-chip with other components of video decoder 30, or off-chip relative to those components.

During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors, and other syntax elements. Entropy decoding unit 70 forwards the motion vectors and other syntax elements to prediction processing unit 71. Video decoder 30 may receive the syntax elements at the video slice level and/or the video block level.

When the video slice is coded as an intra-coded (I) slice, intra prediction processing unit 74 of prediction processing unit 71 may generate prediction data for a video block of the current video slice based on a signaled intra-prediction mode and data from previously decoded blocks of the current frame or picture. When the video frame is coded as an inter-coded (i.e., B or P) slice, motion and disparity compensation unit 72 of prediction processing unit 71 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference picture lists (RefPicList0 and RefPicList1) using default construction techniques based on reference pictures stored in reference picture memory 82.

Motion and disparity compensation unit 72 determines prediction information for a video block of the current video slice by parsing the motion vectors and other syntax elements, and uses the prediction information to produce the predictive blocks for the current video block being decoded. For example, motion and disparity compensation unit 72 uses some of the received syntax elements to determine a prediction mode (e.g., intra- or inter-prediction) used to code the video blocks of the video slice, an inter-prediction slice type (e.g., B slice or P slice), construction information for one or more of the reference picture lists for the slice, motion vectors for each inter-encoded video block of the slice, inter-prediction status for each inter-coded video block of the slice, and other information to decode the video blocks in the current video slice.

Motion and disparity compensation unit 72 may be configured to perform the techniques described in this disclosure. Motion and disparity compensation unit 72 may also perform interpolation based on interpolation filters. Motion and disparity compensation unit 72 may use interpolation filters as used by video encoder 20 during encoding of the video blocks to calculate interpolated values for sub-integer pixels of reference blocks. In this case, motion and disparity compensation unit 72 may determine the interpolation filters used by video encoder 20 from the received syntax elements and use the interpolation filters to produce predictive blocks.

Inverse quantization processing unit 76 inverse quantizes (i.e., de-quantizes), the quantized transform coefficients provided in the bitstream and decoded by entropy decoding unit 70. The inverse quantization process may include use of a quantization parameter calculated by video encoder 20 for each video block in the video slice to determine a degree of quantization and, likewise, a degree of inverse quantization that should be applied. Inverse transform processing unit 78 applies an inverse transform (e.g., an inverse DCT, an inverse integer transform, or a conceptually similar inverse transform process), to the transform coefficients in order to produce residual blocks in the pixel domain.

After motion and disparity compensation unit 72 generates the predictive block for the current video block based on the motion vectors and other syntax elements, video decoder 30 forms a decoded video block by summing the residual blocks from inverse transform processing unit 78 with the corresponding predictive blocks generated by motion and disparity compensation unit 72. Summer 80 represents the component or components that perform this summation operation. If desired, a deblocking filter may also be applied to filter the decoded blocks in order to remove blocking artifacts. Other loop filters (either in the coding loop or after the coding loop) may also be used to smooth pixel transitions, or otherwise improve the video quality. The decoded video blocks in a given picture are then stored in reference picture memory 82, which stores reference pictures used for subsequent motion compensation. Reference picture memory 82 also stores decoded video for later presentation on a display device, such as display device 32 of FIG. 1.

In this manner, video decoder 30 is an example of a video decoder that may be configured to implement one or more example techniques described in this disclosure. For example, video data memory 69 stores video data. The video data may include information from which video decoder 30 can decode a texture video component of a dependent view and a depth view component that corresponds to the texture view component, each of which video encoder 20 is encoded in a 3D-AVC compliant or 3D-HEVC compliant video coding process.

In accordance with one example technique of this disclosure, prediction processing unit 71 may determine, for a current layer being decoded, that the current layer has no direct reference layers. Due to an encoding constraint implemented by video encoder 20 in instances when a current layer has no direct reference layers, entropy decoding unit 70 of video decoder 30 receives one or more of a first syntax element, a second syntax element, a third syntax element, or a fourth syntax element set to a value indicating a disabling value. Disabling value, in this context, means a value indicating that a certain coding tool is disabled.

A disabling value for the first syntax element (e.g. iv_mv_pred_flag[layerId]) indicates to prediction processing unit 71 that inter-view motion parameter prediction is disabled for (e.g. not used to decode) the current layer. A disabling value for the second syntax element (e.g. view_synthesis_pred_flag[layerId]) indicates to prediction processing unit 71 that view synthesis prediction merge candidates are disabled for (e.g. not used to decode) the current layer. A disabling value for the third syntax element (e.g. depth_refinement_flag[layerId]) indicates to prediction processing unit 71 that depth view components are disabled for (e.g. not used as part of) the derivation process for a disparity vector for the current layer. A disabling value the fourth syntax element (e.g. iv_res_pred_flag[layerId]) indicates to prediction processing unit 71 that inter-view residual prediction is disabled for (e.g. not used to decode) the current layer. Disabling (e.g. not invoking) a particular coding tool may reduce the processing performed by video decoder 30, which may improve overall decoding quality by, for example, reducing power consumption of video decoder 30, avoiding playback disruptions due, and other such benefits.

In the techniques described in this disclosure, video decoder 30 may include one or more processors that are configured to decode, in a 3D-AVC compliant or 3D-HEVC compliant video coding process, a texture view component of a dependent view of the video data. To decode the texture view component, video decoder 30 may be configured to evaluate motion information of one or more neighboring blocks of a current block in the texture view component to determine whether at least one neighboring block is inter-view predicted with a disparity motion vector that refers to an inter-view reference picture in a view other than the dependent view. Video decoder 30 may derive a disparity vector for the current block based on the disparity motion vector for one of the neighboring blocks. For texture-first coding, video decoder 30 may decode a depth view component, of the video data, that corresponds to the texture view component subsequent to decoding the texture view component.

In some examples, prediction processing unit 71 of video decoder 30 may be one example of a processor configured to implement the examples described in this disclosure. In some examples, a unit (e.g., one or more processors) other than prediction processing unit 71 may implement the examples described above. In some examples, prediction processing unit 71 in conjunction with one or more other units of video decoder 30 may implement the examples described above. In yet some other examples, a processor of video decoder 30 (not shown in FIG. 13) may, alone or in conjunction with other processors of video decoder 30, implement the examples described above.

Video decoder 30, as described above, may be configured to, for a current layer being decoded, determine that the current layer has no direct reference layers, receiving a first syntax element (e.g. iv_mv_pred_flag[layerId]) set to a value that indicates that inter-view motion parameter prediction is not used to decode the current layer, receive a second syntax element (e.g. view_synthesis_pred_flag[layerId]) set to a value that indicates that view synthesis prediction merge candidates are not used for decoding the current layer, receive a third syntax element (e.g. depth_refinement_flag[layerId]) set to a value that indicates that accessing depth view components are not used in the derivation process for a disparity vector for the current layer, and receive a fourth syntax element (e.g. iv_res_pred_flag[layerId]) set to a value that indicates that inter-view residual prediction is not used in the decoding process of the current layer.

Figure 14:
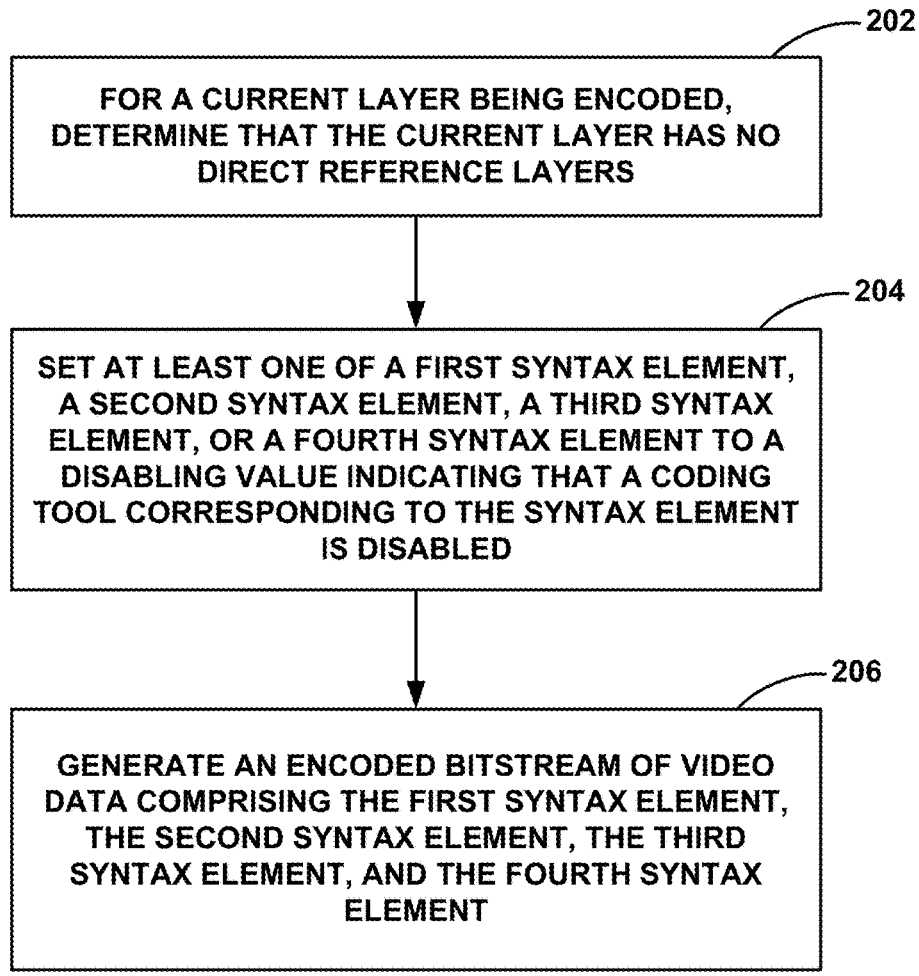
FIG. 14 is a flowchart illustrating an example technique of encoding video data according to techniques of this disclosure.

FIG. 14 is a flowchart illustrating an example technique of encoding video data. For purposes of illustration, the example of FIG. 14 is described with respect to video encoder 20. In the example of FIG. 14, video encoder 20, for a current layer being encoded, determines that the current layer has no direct reference layers (202). Based on determining that the current layer has no direct reference layers, video encoder 20 sets at least one of a first syntax element, a second syntax element, a third syntax element, or a fourth syntax element to a disabling value indicating that a coding tool corresponding to the syntax element is disabled (204). A disabling value for the first syntax element indicates that inter-view motion parameter prediction is disabled for the current layer. A disabling value for the second syntax element indicates that view synthesis prediction merge candidates are disabled for the current layer. A disabling value for the third syntax element indicates that accessing depth view components are disabled for the derivation process for a disparity vector for the current layer. A disabling value for the fourth syntax element indicates that inter-view residual prediction is disabled for the current layer. Video encoder 20 generates an encoded bitstream of video data comprising the first syntax element, the second syntax element, the third syntax element, and the fourth syntax element (206).

The first syntax element, the second syntax element, the third syntax element, and the fourth syntax element may be view-level syntax elements. The coding tool corresponding to the syntax elements may be block-level coding tools.

In some examples, video encoder 20 may set all of the first, second, third, and fourth syntax elements to disabling values. In some implementations, video encoder 20 may always set the at least one of the first syntax element, the second syntax element, the third syntax element, or the fourth syntax element to the disabling value indicating that the coding tool corresponding to the syntax element is disabled in response to determining that the current layer has no direct reference layers. In some implementations, video encoder 20 may always set all of the first, second, third, and fourth syntax elements to disabling values in response to determining that the current layer has no direct reference layers.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of encoding three-dimensional (3D) video data, the method comprising:
   for a current layer being encoded, determining that the current layer has no direct reference layers that are used to predict the current layer;
   in response to determining that the current layer has no direct reference layers, encoding the current layer in accordance with a constraint that requires setting a first syntax element, a second syntax element, a third syntax element, and a fourth syntax element to a disabling value indicating that a coding tool corresponding to the syntax element is disabled;
   in response to the constraint, setting the first syntax element to a disabling value, wherein the disabling value for the first syntax element indicates that inter-view motion parameter prediction is disabled for the current layer;
   in response to the constraint, setting the second syntax element to a disabling value, wherein the disabling value for the second syntax element indicates that view synthesis prediction merge candidates are disabled for the current layer;
   in response to the constraint, setting the third syntax element to a disabling value, wherein the disabling value for the third syntax element indicates that accessing depth view components is disabled for the derivation process for a disparity vector for the current layer;
   in response to the constraint, setting the fourth syntax element to a disabling value, wherein the disabling value for the fourth syntax element indicates that inter-view residual prediction is disabled for the current layer; and
   generating an encoded bitstream of 3D video data comprising the first syntax element, the second syntax element, the third syntax element, and the fourth syntax element.

2. The method of claim 1, wherein the first syntax element, the second syntax element, the third syntax element, and the fourth syntax element are view-level syntax elements.

3. The method of claim 1, wherein the coding tool corresponding to the syntax element comprises a block-level coding tool.

4. A device for encoding three-dimensional (3D) video data, the device comprising:
   a memory configured to store the 3D video data; and
   a video encoder comprising one or more processors configured to:
   for a current layer being encoded, determine that the current layer has no direct reference layers that are used to predict the current layer;
   in response to determining that the current layer has no direct reference layers, encode the current layer in accordance with a constraint that requires setting a first syntax element, a second syntax element, a third syntax element, and a fourth syntax element to a disabling value indicating that a coding tool corresponding to the syntax element is disabled;
   in response to the constraint, set the first syntax element to a disabling value, wherein the disabling value for the first syntax element indicates that inter-view motion parameter prediction is disabled for the current layer;
   in response to the constraint, set the second syntax element to a disabling value, wherein the disabling value for the second syntax element indicates that view synthesis prediction merge candidates are disabled for the current layer;
   in response to the constraint, set the third syntax element to a disabling value, wherein the disabling value for the third syntax element indicates that accessing depth view components is disabled for the derivation process for a disparity vector for the current layer;
   in response to the constraint, set the fourth syntax element to a disabling value, wherein the disabling value for the fourth syntax element indicates that inter-view residual prediction is disabled for the current layer; and
   generate an encoded bitstream of the 3D video data comprising the first syntax element, the second syntax element, the third syntax element, and the fourth syntax element.

5. The device of claim 4, wherein the first syntax element, the second syntax element, the third syntax element, and the fourth syntax element are view-level syntax elements.

6. The device of claim 4, wherein the coding tool corresponding to the syntax element comprises a block-level coding tool.

7. An apparatus for encoding three-dimensional (3D) video data, the apparatus comprising:
   means for determining that a current layer being encoded has no direct reference layers that are used to predict the current layer;
   means for encoding the current layer in accordance with a constraint that requires setting a first syntax element, a second syntax element, a third syntax element, and a fourth syntax element to a disabling value indicating that a coding tool corresponding to the syntax element is disabled in response to determining that the current layer has no direct reference layers;
   means for setting the first syntax element to a disabling value in response to the constraint, wherein the disabling value for the first syntax element indicates that inter-view motion parameter prediction is disabled for the current layer;
   means for setting the second syntax element to a disabling value in response to the constraint, wherein the disabling value for the second syntax element indicates that view synthesis prediction merge candidates are disabled for the current layer;
   means for setting the third syntax element to a disabling value in response to the constraint, wherein the disabling value for the third syntax element indicates that accessing depth view components is disabled for the derivation process for a disparity vector for the current layer;

means for setting the fourth syntax element to a disabling value in response to the constraint, wherein the disabling value for the fourth syntax element indicates that inter-view residual prediction is disabled for the current layer; and means for generating an encoded bitstream of 3D video data comprising the first syntax element, the second syntax element, the third syntax element, and the fourth syntax element.

8. The apparatus of claim 7, wherein the first syntax element, the second syntax element, the third syntax element, and the fourth syntax element are view-level syntax elements.

9. The apparatus of claim 7, wherein the coding tool corresponding to the syntax element comprises a block-level coding tool.

10. The apparatus of claim 7, wherein the means for setting the at least one of the first syntax element, the second syntax element, the third syntax element, or the fourth syntax element to the disabling value indicating that the coding tool corresponding to the syntax element is disabled in response to determining that the current layer has no direct reference layers.

11. A non-transitory computer-readable storage medium storing instructions that when executed by one or more processors cause the one or more processors to:

for a current layer being encoded, determine that the current layer has no direct reference layers that are used to predict the current layer;

in response to determining that the current layer has no direct reference layers, encode the current layer in accordance with a constraint that requires setting a first syntax element, a second syntax element, a third syntax element, and a fourth syntax element to a disabling value indicating that a coding tool corresponding to the syntax element is disabled;

in response to the constraint, set the first syntax element to a disabling value, wherein the disabling value for the first syntax element indicates that inter-view motion parameter prediction is disabled for the current layer;

in response to the constraint, set the second syntax element to a disabling value, wherein the disabling value for the second syntax element indicates that view synthesis prediction merge candidates are disabled for the current layer;

in response to the constraint, set the third syntax element to a disabling value, wherein the disabling value for the third syntax element indicates that accessing depth view components is disabled for the derivation process for a disparity vector for the current layer;

in response to the constraint, set the fourth syntax element to a disabling value, wherein the disabling value for the fourth syntax element indicates that inter-view residual prediction is disabled for the current layer; and generate an encoded bitstream of the 3D video data comprising the first syntax element, the second syntax element, the third syntax element, and the fourth syntax element.

12. The non-transitory computer-readable storage medium of claim 11, wherein the first syntax element, the second syntax element, the third syntax element, and the fourth syntax element are view-level syntax elements.

13. The non-transitory computer-readable storage medium of claim 11, wherein the coding tool corresponding to the syntax element comprises a block-level coding tool.

14. The device of claim 4, wherein the device comprises a wireless communication device, further comprising a transmitter configured to transmit the encoded bitstream of the 3D video data.

15. The device of claim 14, wherein the wireless communication device comprises a telephone handset and wherein the transmitter is configured to modulate, according to a wireless communication standard, a signal comprising the encoded bitstream of the 3D video data.

* * * * *